United States Patent
Matsumura et al.

(10) Patent No.: US 12,513,678 B2
(45) Date of Patent: Dec. 30, 2025

(54) TERMINAL, METHOD, BASE STATION, AND SYSTEM FOR PERFORMING REPETITIVE TRANSMISSION OF PHYSICAL UPLINK SHARED CHANNEL (PUSCH)

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 449 days.

(21) Appl. No.: 18/004,983

(22) PCT Filed: Jul. 31, 2020

(86) PCT No.: PCT/JP2020/029583
§ 371 (c)(1),
(2) Date: Jan. 10, 2023

(87) PCT Pub. No.: WO2022/024394
PCT Pub. Date: Feb. 3, 2022

(65) Prior Publication Data
US 2023/0247617 A1   Aug. 3, 2023

(51) Int. Cl.
*H04W 72/044* (2023.01)
*H04L 5/00* (2006.01)

(52) U.S. Cl.
CPC ......... *H04W 72/046* (2013.01); *H04L 5/0092* (2013.01)

(58) Field of Classification Search
CPC .. H04W 72/046; H04L 5/0092; H04L 5/0023; H04L 5/0048; H04L 5/0051; H04L 5/0053; H04B 7/06966
See application file for complete search history.

(56) References Cited

U.S. PATENT DOCUMENTS

2021/0184812 A1*  6/2021  MolavianJazi ....... H04W 72/23
2021/0184819 A1   6/2021  Takeda et al.
(Continued)

FOREIGN PATENT DOCUMENTS

| CN | 111294177 A | 6/2020 |
| EP | 3 809 602 A1 | 4/2021 |

(Continued)

OTHER PUBLICATIONS

Guo, Li; Methods and Apparatus of Transmission of PUSCH; Jan. 30, 2020, p. 11, lines 1-11 (Year: 2020).*

(Continued)

*Primary Examiner* — Ian N Moore
*Assistant Examiner* — Latresa A Mccallum
(74) *Attorney, Agent, or Firm* — Osha Bergman Watanabe & Burton LLP

(57) ABSTRACT

A terminal according to an aspect of the present disclosure includes a control section that determines spatial relation information for a plurality of uplink shared channels (Physical Uplink Shared Channels (PUSCHs)) by using a single downlink control information (DCI), and a transmitting section that transmits the plurality of PUSCHs by using a spatial domain transmission filter based on the spatial relation information. According to an aspect of the present disclosure, even when multi-TRP is used, UL transmission can be appropriately controlled.

6 Claims, 20 Drawing Sheets

(56) References Cited

U.S. PATENT DOCUMENTS

| | | | | |
|---|---|---|---|---|
| 2022/0345272 A1* | 10/2022 | Guo | ...................... | H04W 72/20 |
| 2023/0019570 A1* | 1/2023 | Guo | ...................... | H04L 5/0051 |
| 2023/0189254 A1* | 6/2023 | Go | .......................... | H04B 7/06 |
| | | | | 370/329 |
| 2023/0353298 A1* | 11/2023 | Liu | ......................... | H04L 1/08 |

FOREIGN PATENT DOCUMENTS

| | | | |
|---|---|---|---|
| WO | 2019/244207 | A1 | 12/2019 |
| WO | 2020044409 | A1 | 3/2020 |
| WO | 2020/144782 | A1 | 7/2020 |
| WO | 2020/148903 | A1 | 7/2020 |

OTHER PUBLICATIONS

Office Action issued in counterpart Chinese Patent Application No. 202080105729.9 mailed on Mar. 6, 2024 (13 pages).

International Search Report issued in PCT/JP2020/029583 on Mar. 2, 2021 (2 pages).

Written Opinion of the International Searching Authority issued in PCT/JP2020/029583 on Mar. 2, 2021 (4 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Office Action issued in Japanese Application No. 2022-539986, mailed Jul. 30, 2024 (7 pages).

* cited by examiner

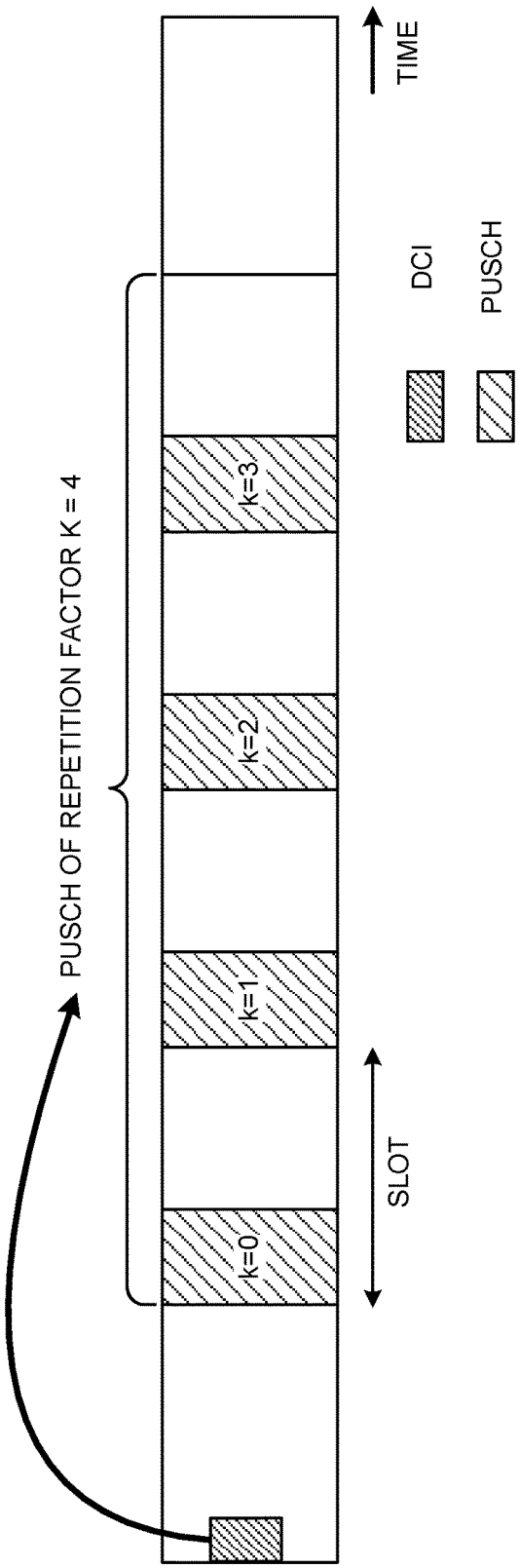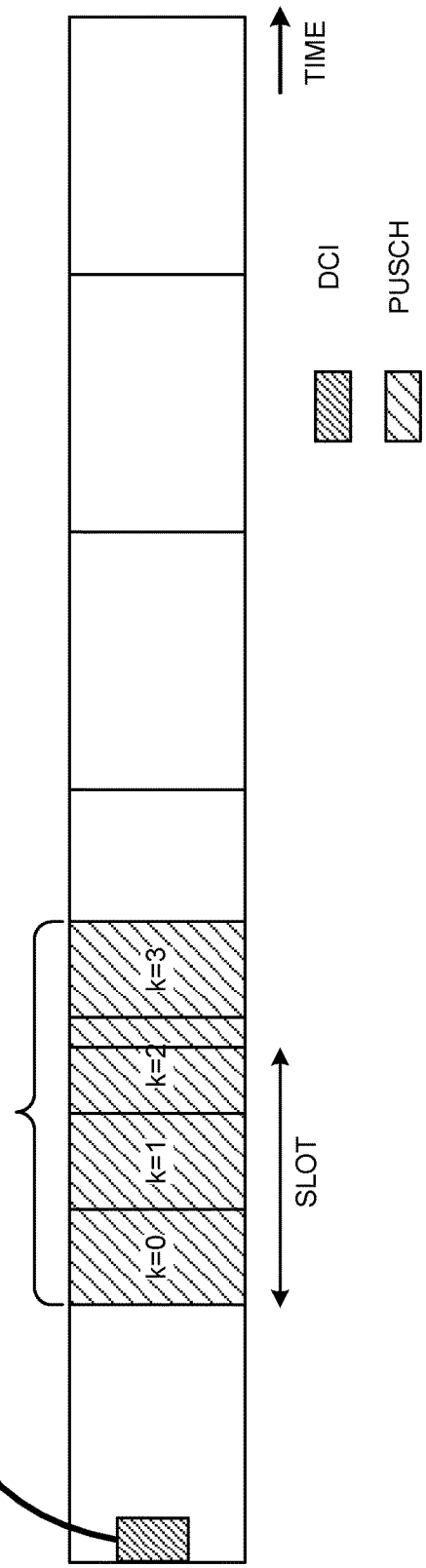

FIG. 5A

| VALUE OF SRI FIELD | PUSCH (SRI) |
|---|---|
| 0 | SRI#X_1 |
| 1 | SRI#X_2 |

FIG. 5B

| VALUE OF SRI FIELD | PUSCH#1 | PUSCH#2 |
|---|---|---|
| 00 | SRI#X_1 | SRI#Y_1 |
| 01 | SRI#X_2 | SRI#Y_2 |
| 10 | SRI#X_1 | SRI#Y_1 |
| 11 | SRI#X_2 | SRI#Y_2 |

FIG. 5C

| VALUE OF SRI FIELD | PUSCH#1 | PUSCH#2 |
|---|---|---|
| 0 | SRI#X_1 | SRI#Y_1 |
| 1 | SRI#X_2 | SRI#Y_2 |

FIG. 5D

| VALUE OF SRI FIELD | PUSCH |
|---|---|
| 0 | SRI#X_0, SRI#Y_0 |
| 1 | SRI#X_1, SRI#Y_1 |

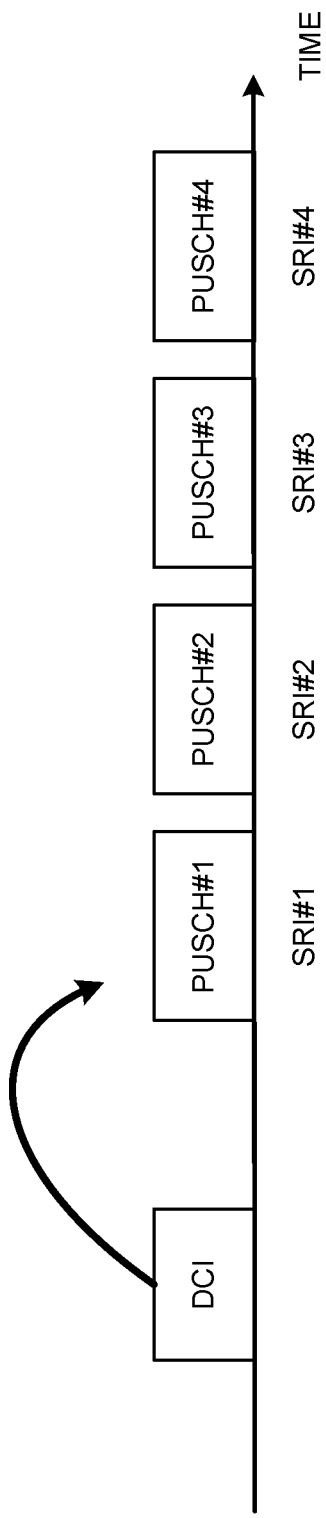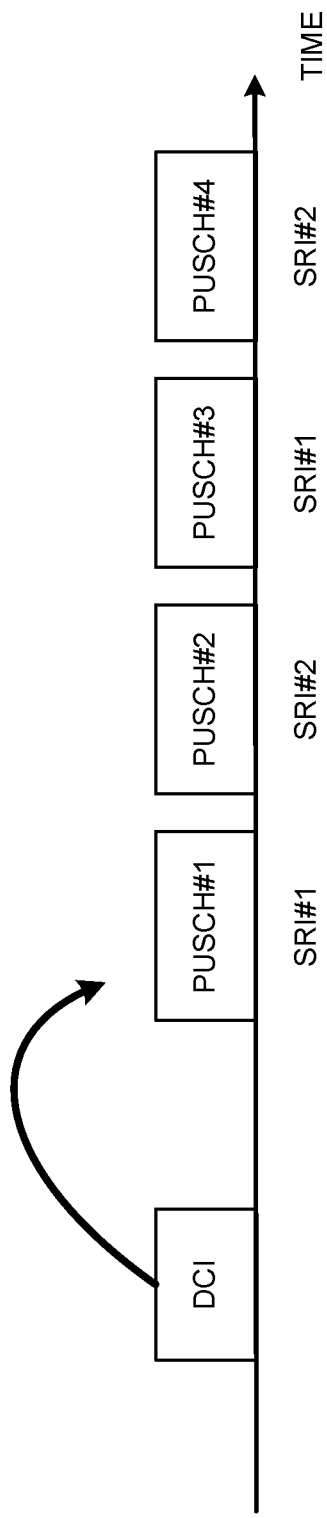
FIG. 6A
FIG. 6B

| VALUE OF SRI FIELD | PUSCH (SRI) |
|---|---|
| 0 | SRI#1 |
| 1 | SRI#1, SRI#2 |

DCI fields | ... | TPMI FIELD #1 | TPMI FIELD #2 | ...

FIG. 8B

| VALUE OF TPMI FIELD | PUSCH#1 | PUSCH#2 |
|---|---|---|
| 00 | TPMI#0 | TPMI#1 |
| 01 | TPMI#1 | TPMI#2 |
| 10 | TPMI#2 | TPMI#3 |
| 11 | TPMI#3 | TPMI#3 |

FIG. 10A

| VALUE OF SRI FIELD | PUSCH (SRI) |
|---|---|
| 0 | SRI#0_0 |
| 1 | SRI#0_1 |

FIG. 10B

| VALUE OF SRI FIELD | PUSCH (SRI) |
|---|---|
| 0 | SRI#1_0 |
| 1 | SRI#1_1 |

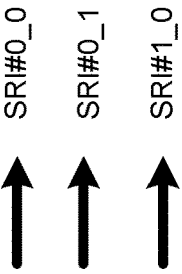

TERMINAL, METHOD, BASE STATION, AND SYSTEM FOR PERFORMING REPETITIVE TRANSMISSION OF PHYSICAL UPLINK SHARED CHANNEL (PUSCH)

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In 3GPP Rel. 15, repetition transmission is supported in a UL data channel (for example, an uplink shared channel (Physical Uplink Shared Channel (PUSCH))). A UE controls to perform transmission of PUSCHs over a plurality of slots (for example, K consecutive slots), based on a repetition factor K configured from a network (for example, a base station). In other words, when repetition transmission is performed, the PUSCHs are each transmitted in different slots (for example, a unit of a slot).

In contrast, in Rel. 16 or later versions, when PUSCH repetition transmission is performed, performing a plurality of PUSCH transmissions in one slot is under study. In other words, transmission of each PUSCH is performed in a unit shorter than a slot (for example, a unit of a sub-slot, a unit of a mini-slot).

For NR, communication using one or a plurality of transmission/reception points (TRPs) (multi-TRP) is under study.

However, in NR specifications thus far, a full study has not been conducted on how to control PUSCH repetition transmission in the multi-TRP. A full study has not yet been conducted not only on repetition transmission but also on a method for appropriately performing UL transmission to the multi-TRP. Unless UL transmission over the multi-TRP is appropriately performed, throughput may be reduced or communication quality may be deteriorated.

In view of this, the present disclosure has one object to provide a terminal, a radio communication method, and a base station that enable appropriate control of UL transmission even when multi-TRP is used.

Solution to Problem

A terminal according to an aspect of the present disclosure includes a control section that determines spatial relation information for a plurality of uplink shared channels (Physical Uplink Shared Channels (PUSCHs)) by using a single downlink control information (DCI), and a transmitting section that transmits the plurality of PUSCHs by using a spatial domain transmission filter based on the spatial relation information.

Advantageous Effects of Invention

According to an aspect of the present disclosure, even when multi-TRP is used, UL transmission can be appropriately controlled.

BRIEF DESCRIPTION OF DRAWINGS

FIGS. 1A and 1B are diagrams to show examples of repetition transmission of PUSCH.

FIGS. 5A to 5D are diagrams to show examples of correspondence between a value of an SRI field and an SRI for PUCCH repetition according to a first embodiment.

FIGS. 6A and 6B are diagrams to show examples of parameters applied to respective repetitions when the number of indicated parameters is the same as/different from the number of repetitions.

FIG. 7 is a diagram to show an example of determination of the number of repetitions based on the number of specific parameters.

FIGS. 8A and 8B are diagrams to show examples of TPMI indication according to the first embodiment.

FIGS. 10A and 10B are diagrams to show examples of correspondence of the SRI field for each CORESET pool index according to a third embodiment.

FIGS. 13A and 13B are diagrams to show examples of a configuration of the SRS resource sets and the SRS resources according to Embodiment 3.3.

FIGS. 14A and 14B are diagrams to show examples of a MAC CE for update of spatial relation of SRSs according to the third embodiment.

DESCRIPTION OF EMBODIMENTS

Repetition Transmission

Figure 2A:
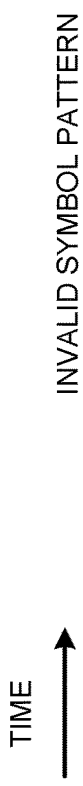
FIGS. 2A and 2B are diagrams to show examples of an invalid symbol pattern.

In Rel. 15, repetition transmission is supported in data transmission. For example, a base station (a network (NW), a gNB) repeats transmission of DL data (for example, a downlink shared channel (PDSCH)) certain times. Alternatively, a UE repeats UL data (for example, an uplink shared channel (PUSCH)) certain times.

FIG. 1A is a diagram to show an example of repetition transmission of PUSCH. FIG. 1A shows an example in which a certain number of repetitions of the PUSCH is scheduled by single-DCI. The number of repetitions is also referred to as a repetition factor K or an aggregation factor K.

In FIG. 1A, repetition factor K=4. However, a value of K is not limited thereto. An n-th repetition is also referred to as an n-th transmission occasion or the like, and may be identified by a repetition index k ($0 \leq k \leq K-1$). FIG. 1A shows repetition transmission of PUSCH dynamically scheduled by DCI (for example, dynamic grant-based PUSCH). However, this may be applied to repetition transmission of configured grant-based PUSCH.

For example, in FIG. 1A, the UE semi-statically receives information (for example, aggregationFactorUL or aggregationFactorDL) indicating the repetition factor K, using higher layer signaling. Here, the higher layer signaling may be, for example, any one of or a combination of RRC (Radio Resource Control) signaling, MAC (Medium Access Control) signaling, broadcast information, and the like.

For example, the MAC signaling may use a MAC control element (MAC CE), a MAC PDU (Protocol Data Unit), and the like. For example, the broadcast information may be a master information block (MIB), a system information block (SIB), minimum system information (RMSI (Remaining Minimum System Information)), and the like.

The UE controls PDSCH reception processing (for example, at least one of reception, demapping, demodulation, and decoding) or PUSCH transmission processing (for example, at least one of transmission, mapping, modulation, and coding) in K consecutive slots, based on at least one of the following field values (or pieces of information indicated by the field values) in the DCI:

allocation of time domain resources (for example, a start symbol, the number of symbols in each slot, and the like),
allocation of frequency domain resources (for example, a certain number of resource blocks (RBs), a certain number of resource block groups (RBGs)),
modulation and coding scheme (MCS) index,
configuration of a PUSCH demodulation reference signal (DMRS), spatial relation information (spatial relation info) of the PUSCH, or a state of transmission configuration indication (or Transmission Configuration Indicator (TCI)) (TCI state (TCI-state)).

Among the K consecutive slots, the same symbol allocation may be applied. FIG. 1A shows a case in which the PUSCH in each slot is allocated to a certain number of symbols from the start of the slot. The same symbol allocation among the slots may be determined as described in the time domain resource allocation.

For example, the UE may determine symbol allocation in each slot, based on the start symbol S and the number L of symbols (for example, a Start and Length Indicator (SLIV)) determined based on a value m of a certain field (for example, a TDRA field) in the DCI. Note that the UE may determine a first slot, based on K2 information determined based on the value m of the certain field (for example, the TDRA field) in the DCI.

In contrast, among the K consecutive slots, a redundancy version (RV) applied to a TB based on the same data may be the same, or may be at least partially different. For example, the RV applied to the TB in the n-th slot (transmission occasion, repetition) may be determined based on a value of a certain field (for example, an RV field) in the DCI.

When the resources allocated in the K consecutive slots have, in at least one symbol, a communication direction different from UL, DL, or flexible in each slot indicated by at least one of uplink/downlink communication direction indication information for TDD control (for example, RRC IEs "TDD-UL-DL-ConfigCommon" and "TDD-UL-DL-ConfigDedicated") and a slot format indicator of DCI (for example, DCI format 2_0), the resources of the slot including the symbol may not be transmitted (or received).

In Rel. 15, as shown in FIG. 1A, PUSCHs are repeatedly transmitted over a plurality of slots (unit of a slot), whereas in Rel. 16 or later versions, it is assumed that repetition transmission of PUSCH is performed in a unit shorter than a slot (for example, a unit of a sub-slot, a unit of a mini-slot, or a unit of a certain number of symbols) (see FIG. 1B).

In FIG. 1B, repetition factor K=4. However, a value of K is not limited thereto. An n-th repetition is also referred to as an n-th transmission occasion or the like, and may be identified by a repetition index k ($0 \leq k \leq K-1$). FIG. 1B shows repetition transmission of PUSCH dynamically scheduled by DCI (for example, dynamic grant-based PUSCH). However, this may be applied to repetition transmission of configured grant-based PUSCH.

The UE may determine symbol allocation of PUSCH transmission (for example, PUSCH of k=0) in a certain slot, based on the start symbol S and the number L of symbols (for example, StartSymbol and length) determined based on a value m of a certain field (for example, a TDRA field) in the DCI of the PUSCH. Note that the UE may determine a certain slot, based on Ks information determined based on the value m of the certain field (for example, the TDRA field) in the DCI.

The UE may dynamically receive information (for example, numberofrepetitions) indicating the repetition factor K, using downlink control information. The repetition factor may be determined, based on the value m of the certain field (for example, the TDRA field) in the DCI. For example, a table defining correspondence between a bit value reported on the DCI and the repetition factor K and the start symbol S and the number L of symbols may be supported.

Slot-based repetition transmission shown in FIG. 1A may be referred to as repetition transmission type A (for example, PUSCH repetition Type A), and sub-slot-based repetition transmission shown in FIG. 1B may be referred to as repetition transmission type B (for example, PUSCH repetition Type B).

The UE may be configured to apply at least one of repetition transmission type A and repetition transmission type B. For example, the repetition transmission type applied by the UE may be reported from the base station to the UE, by using higher layer signaling (for example, PUSCHRepTypeIndicator).

Any one of repetition transmission type A and repetition transmission type B may be configured for the UE for each DCI format for scheduling the PUSCH.

For example, when higher layer signaling (for example, PUSCHRepTypeIndicator-AorDCIFormat0_1) is configured to repetition transmission type B (for example, PUSCH-RepTypeB) regarding a first DCI format (for example, DCI format 0_1), the UE applies repetition transmission type B to PUSCH repetition transmission scheduled by the first DCI format. Otherwise (for example, when PUSCH-RepTypeB is not configured, or when PUSCH-RepTypA is configured), the UE the UE applies repetition transmission type A to PUSCH repetition transmission scheduled by the first DCI format.

Invalid Symbol Pattern

When repetition transmission type B is applied to PUSCH transmission, reporting to the UE of information related to symbol(s) (or a symbol pattern) that is unavailable for PUSCH transmission is under study as well. The symbol pattern that is unavailable for PUSCH transmission may be referred to as an invalid symbol pattern, an Invalid symbol pattern, or the like.

Reporting of the invalid symbol pattern by using at least one of higher layer signaling and DCI is under study. The DCI may be a certain DCI format (for example, at least one of DCI formats 0_1 and 0_2).

For example, using a first higher layer parameter, information related to the invalid symbol pattern that is unavailable for PUSCH transmission is reported to the UE. Whether or not the information related to the invalid symbol pattern is applied may be reported to the UE, by using DCI. In this case, a bit field for indicating whether or not the information related to the invalid symbol pattern is applied (an indication field as to whether or not the invalid symbol pattern is applied) may be configured for the DCI.

Using a second higher layer parameter, whether or not the indication field (or an additional bit) in the DCI is configured may be reported to the UE. In other words, when the information related to the invalid symbol pattern is reported to the UE using the first higher layer parameter, the UE may determine whether or not to apply the information related to the invalid symbol pattern, based on the second higher layer parameter and the DCI.

When the first higher layer parameter is not reported or configured, the UE may control transmission of the PUSCH without taking the invalid symbol pattern into consideration. When the first higher layer parameter is reported or configured, the UE may determine whether or not to apply the invalid symbol pattern, based on the second higher layer parameter and the DCI. For example, addition of an additional bit (or a certain field) for indicating whether or not to apply the invalid symbol pattern to the DCI is indicated by the second higher layer parameter, the UE may determine whether or not to apply the invalid symbol pattern, based on the certain field.

Figure 2B:
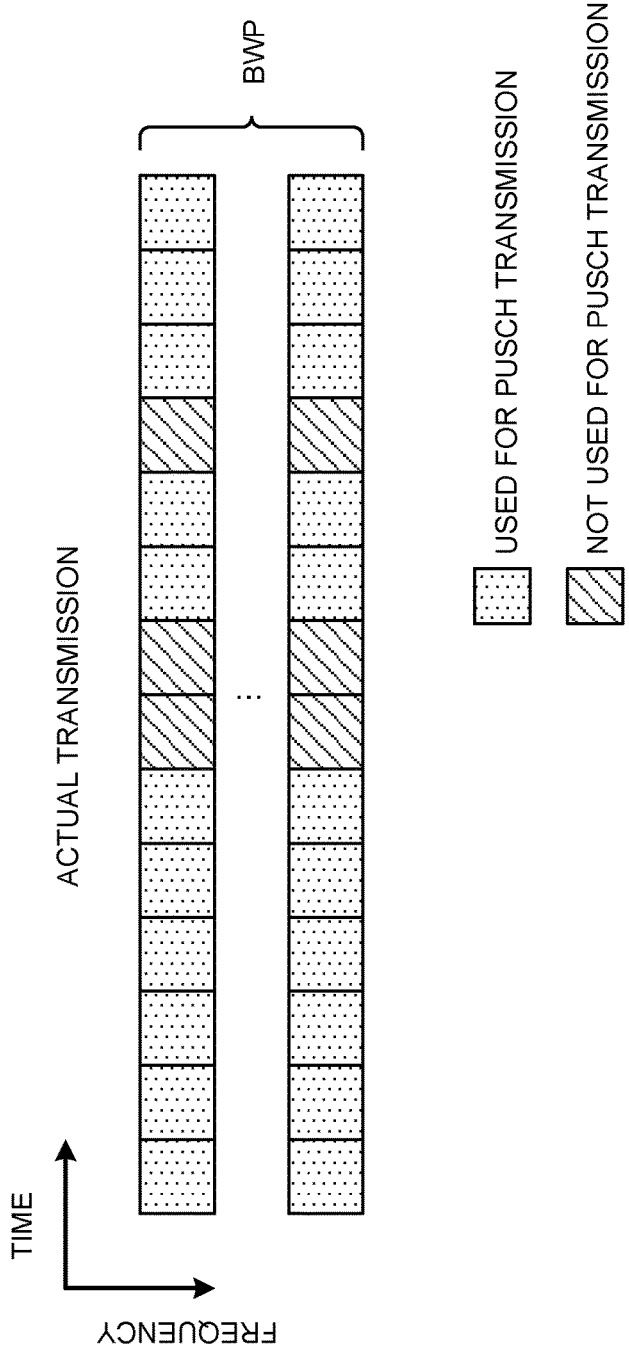

The first higher layer parameter may be information for reporting a symbol pattern that is invalid for transmission of the PUSCH, and for example, a bitmap format may be applied (see FIG. 2A). FIG. 2A is a diagram to show an example of a case in which the invalid symbol pattern is defined in a bitmap (1-D bitmap) with respect to the time domain. Based on the information related to the invalid symbol pattern, the UE may determine the resources that is available for PUSCH transmission in one or more frequency bandwidths (for example, BWPs) (see FIG. 2B).

Here, a case is shown in which one or a common invalid symbol pattern is applied to a plurality of BWPs. However, a different invalid symbol pattern may be configured or applied for each BWP.

Nominal Repetitions/Actual Repetitions

When repetition transmission is performed in a unit of a sub-slot by applying repetition transmission type B, a certain repetition transmission may cross a slot-boundary, depending on a repetition factor (K), a unit of allocation of data, and the like.

Figure 3A:
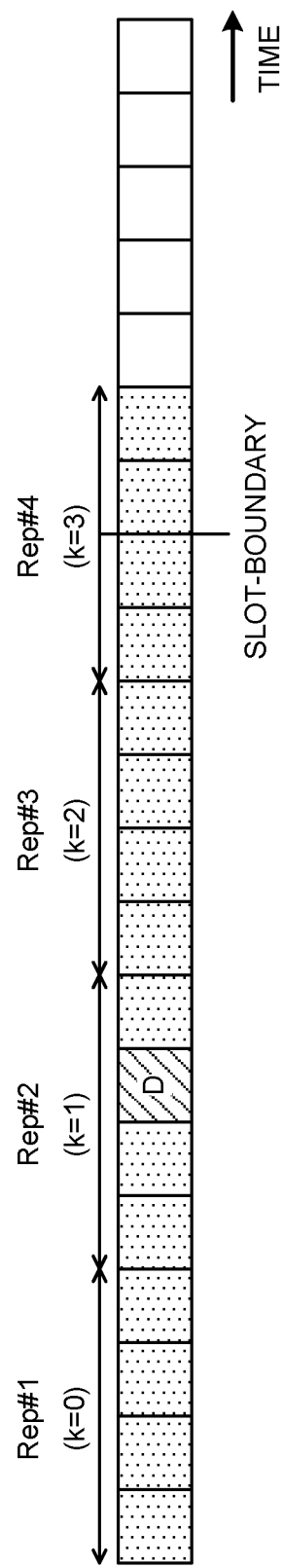
FIGS. 3A and 3B are diagrams to show examples of nominal repetitions and actual repetitions.

FIG. 3A shows an example of a case in which repetition transmission type B is applied, with the repetition factor (K) being 4 and the PUSCH length (L) being 4. In FIG. 3A, the PUSCH of k=3 is mapped across the slot-boundary. In such a case, the PUSCH may be transmitted being divided (or segmented) with respect to the slot-boundary (see FIG. 3B).

It is also assumed that a symbol that is unavailable for PUSCH transmission (for example, a DL symbol, an invalid symbol, or the like) may be included in a slot. FIG. 3A shows a case in which a part of symbols to which the PUSCH of k=1 is mapped includes a symbol (here, a DL symbol) that is unavailable for the PUSCH transmission. In such a case, the PUSCH transmission may be performed using symbols except the DL symbol (see FIG. 3B).

When certain PUSCH-allocated symbols include a DL symbol (or an invalid symbol) in a symbol other than both ends, PUSCH transmission may be performed using symbols other than the part corresponding to the DL symbol. In this case, the PUSCH may be divided (or segmented).

Figure 3B:
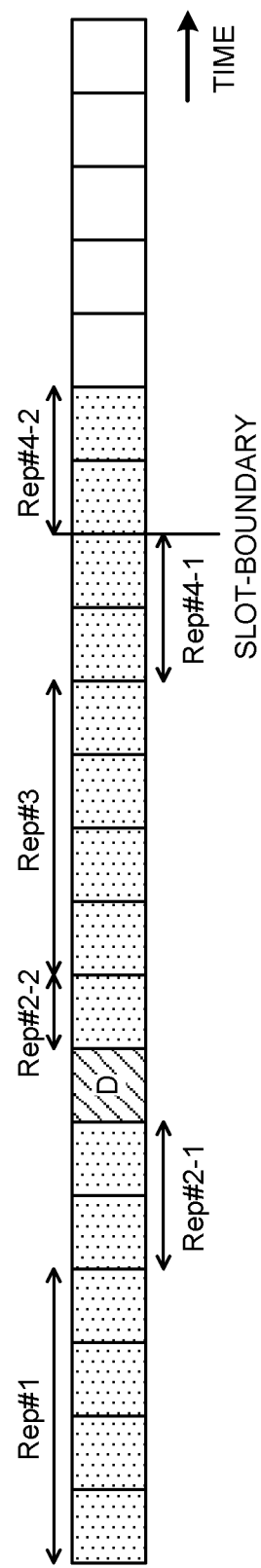

FIG. 3B shows a case in which the PUSCH of k=1 (Rep #2) is divided into two (Reps #2-1 and #2-2) by the DL symbol, and the PUSCH of k=3 (Rep #4) is divided into two (Reps #4-1 and #4-2) by the slot-boundary in sub-slot-based repetition transmission.

Note that repetition transmission (FIG. 3A) before the DL symbol, the invalid symbol, or the slot-boundary is taken into consideration may be referred to as nominal repetitions. Repetition transmission (FIG. 3B) that takes the DL symbol, the invalid symbol, or the slot-boundary into consideration may be referred to as actual repetitions.

Spatial Relation for SRS and PUSCH

In Rel-15 NR, the UE may receive information (SRS configuration information, for example, a parameter in an RRC control element "SRS-Config") that is used for transmission of a reference signal for measurement (for example, a sounding reference signal (SRS)).

Specifically, the UE may receive at least one of information related to one or a plurality of SRS resource sets (SRS resource set information, for example, an RRC control element "SRS-ResourceSet") and information related to one or a plurality of SRS resources (SRS resource information, for example, an RRC control element "SRS-Resource").

One SRS resource set may be related to a certain number of SRS resources (a certain number of SRS resources may be grouped together). Each SRS resource may be identified by an SRS resource indicator (SRI) or an SRS resource ID (Identifier).

The SRS resource set information may include information of an SRS resource set ID (SRS-ResourceSetId), a list of SRS resource IDs (SRS-ResourceId) used in the resource set, an SRS resource type (for example, any one of a periodic SRS, a semi-persistent SRS, and aperiodic CSI (Aperiodic SRS)), and usage of the SRS.

Here, the SRS resource type may indicate any one of the periodic SRS (P-SRS), the semi-persistent SRS (SP-SRS), and the aperiodic CSI (Aperiodic SRS (A-SRS)). Note that the UE may periodically (or periodically after activation) transmit the P-SRS and the SP-SRS, and transmit the A-SRS, based on an SRS request of the DCI.

The usage (an RRC parameter "usage", an L1 (Layer-1) parameter "SRS-SetUse") may be, for example, beam management (beamManagement), codebook (CB), noncodebook (NCB), antenna switching, or the like. The SRS with the usage of the codebook or the noncodebook may be used for determination of a precoder of codebook-based or noncodebook-based PUSCH transmission based on the SRI.

For example, in a case of codebook-based transmission, the UE may determine the precoder for PUSCH transmission, based on the SRI, a transmitted rank indicator (TRI), and a transmitted precoding matrix indicator (TPMI). In a case of noncodebook-based transmission, the UE may determine the precoder for PUSCH transmission, based on the SRI.

The SRS resource information may include an SRS resource ID (SRS-ResourceId), the number of SRS ports, an SRS port number, transmission Comb, SRS resource mapping (for example, a time and/or frequency resource position, a resource offset, periodicity of resources, the number of repetitions, the number of SRS symbols, an SRS bandwidth, or the like), hopping related information, an SRS resource type, a sequence ID, spatial relation information of the SRS, or the like.

The spatial relation information (for example, an RRC information element "spatialRelationInfo") of the SRS may indicate spatial relation information between a certain reference signal and the SRS. The certain reference signal may be at least one of a synchronization signal/broadcast channel (a Synchronization Signal/Physical Broadcast Channel (SS/PBCH)) block, a channel state information reference signal (CSI-RS), and an SRS (for example, another SRS). The SS/PBCH block may be referred to as a synchronization signal block (SSB).

The spatial relation information of the SRS may include at least one of an SSB index, a CSI-RS resource ID, and an SRS resource ID as an index of the certain reference signal.

Note that, in the present disclosure, an SSB index, an SSB resource ID, and an SSB Resource Indicator (SSBRI) may be interchangeably interpreted. A CSI-RS index, a CSI-RS resource ID, and a CSI-RS Resource Indicator (CRI) may be interchangeably interpreted. An SRS index, an SRS resource ID, and an SRI may be interchangeably interpreted.

The spatial relation information of the SRS may include a serving cell index, a BWP index (BWP ID), or the like corresponding to the certain reference signal.

Regarding a certain SRS resource, when the spatial relation information related to the SSB or the CSI-RS and the SRS is configured for the UE, the UE may transmit the SRS resource by using a spatial domain filter (spatial domain transmission filter) the same as a spatial domain filter (spatial domain reception filter) for reception of the SSB or the CSI-RS. In this case, the UE may assume that a UE receive beam of the SSB or the CSI-RS and a UE transmit beam of the SRS are the same.

Regarding a certain SRS (target SRS) resource, when the spatial relation information related to another SRS (reference SRS) and the SRS (target SRS) is configured for the UE, the UE may transmit the target SRS resource by using a spatial domain filter (spatial domain transmission filter) the same as a spatial domain filter (spatial domain transmission filter) for transmission of the reference SRS. In other words, in this case, the UE may assume that a UE transmit beam of the reference SRS and a UE transmit beam of the target SRS are the same.

Based on a value of a certain field (for example, an SRS resource indicator (SRI) field) in DCI (for example, DCI format 0_1), the UE may determine spatial relation of the PUSCH scheduled by the DCI. Specifically, the UE may use, for PUSCH transmission, the spatial relation information (for example, the RRC information element "spatialRelationInfo") of the SRS resource determined based on a value (for example, the SRI) of the certain field.

When codebook-based transmission is used for the PUSCH, for the UE, two SRS resources may be configured for each SRS resource set by RRC, and one of the two SRS resources may be indicated by the DCI (the SRI field of 1 bit). When noncodebook-based transmission is used for the PUSCH, for the UE, four SRS resources may be configured for each SRS resource set by RRC, and one of the four SRS resources may be indicated by the DCI (the SRI field of 2 bits).

Multi-TRP

Figure 4:
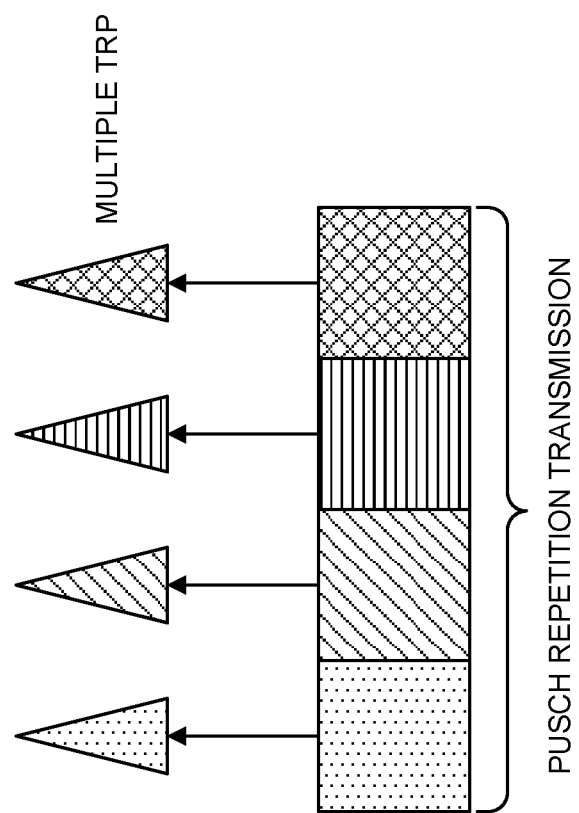
FIG. 4 is a diagram to show an example of PUSCH repetition transmission in multi-TRP.

In NR, a scheme in which one or a plurality of transmission/reception points (TRPs) (multi-TRP (M-TRP)) perform DL transmission to the UE by using one or a plurality of panels (multi-panel) is under study. A scheme in which the UE performs UL transmission to one or a plurality of TRPs is under study as well (see FIG. 4).

If the PUSCH transmission of repetition transmission type A and repetition transmission type B described above can be transmitted over the M-TRP, considerable performance enhancement can be expected in comparison to single PUSCH transmission. However, a full study has not been conducted on how to control PUSCH repetition transmission over the M-TRP. A full study has not yet been conducted not only on repetition transmission but also on a method for appropriately performing UL transmission (a PUSCH, a PUCCH, and the like) to the M-TRP. Unless UL transmission over the M-TRP is appropriately performed, throughput may be reduced or communication quality may be deteriorated.

In view of this, the inventors of the present invention came up with the idea of a control method of UL transmission over the M-TRP. According to an aspect of the present disclosure, for example, the UE can perform UL transmission for the multi-TRP, using different beams.

Embodiments according to the present disclosure will be described in detail with reference to the drawings as follows. The radio communication methods according to respective embodiments may each be employed individually, or may be employed in combination.

Note that, in the present disclosure, "A/B" may mean "at least one of A and B".

In the present disclosure, activate, deactivate, indicate, select, configure, update, determine, and the like may be interchangeably interpreted. In the present disclosure, a sequence, a list, a set, a group, and the like may be interchangeably interpreted.

In the present disclosure, a panel, a beam, a panel group, a beam group, an Uplink (UL) transmission entity, a TRP, spatial relation information (SRI), a spatial relation, a control resource set (CORESET), a Physical Downlink Shared Channel (PDSCH), a codeword, a base station, a certain antenna port (for example, a demodulation reference signal (DMRS) port), a certain antenna port group (for example, a DMRS port group), a certain group (for example, a code division multiplexing (CDM) group, a certain reference signal group, or a CORESET group), a certain resource (for example, a certain reference signal resource), a certain resource set (for example, a certain reference signal resource set), a CORESET pool, a PUCCH group (PUCCH resource group), a spatial relation group, a downlink TCI state (DL TCI state), an uplink TCI state (UL TCI state), a unified TCI state, and the like may be interchangeably interpreted.

Note that, regarding single-DCI, an i-th TRP (TRP #i) may mean an i-th TCI state, an i-th CDM group, or the like (i is an integer).

Note that, regarding multi-DCI, an i-th TRP (TRP #i) may mean a CORESET corresponding to CORESET pool index=i, an i-th TCI state, an i-th CDM group, or the like (i is an integer).

A panel may be related to at least one of a group index of an SSB/CSI-RS group, a group index of a group-based beam report, and a group index of an SSB/CSI-RS group for a group-based beam report.

A panel Identifier (ID) and a panel may be interchangeably interpreted. In other words, a TRP ID and a TRP, a CORESET group ID and a CORESET group, and the like may be interchangeably interpreted.

In the present disclosure, an index, an ID, an indicator, and a resource ID may be interchangeably interpreted. In the present disclosure, a list, a group, a cluster, a subset, and the like may be interchangeably interpreted.

Repetitions of the present disclosure may be interchangeably interpreted as MTRP-based repetitions, repetitions of Rel. 17, repetitions applying different spatial relations, repetition PUSCHs, repetition PUCCHs, repetition transmission, and the like. Repetition transmission in the embodiments described below may correspond to at least one of repetition transmission type A, repetition transmission type B, and other repetition transmission types.

The SRS resource set in the embodiments described below may be interpreted as an SRS resource set with the usage of the codebook or the noncodebook, or may be interpreted as an SRS resource set with other usage.

Radio Communication Method

First Embodiment

In a first embodiment, the UE determines specific parameter(s) for a plurality of PUSCH transmission occasions among the repetition PUSCHs, based on a single DCI.

The specific parameter may correspond to at least one of the following:
  TPMI,
  UL beam parameter (for example, an SRI, a spatial relation, a UL TCI state),
  transmit power control (TPC) related parameter (for example, a TPC command, α, P0, a closed loop power control state, a pathloss reference signal (PL-RS)).

The UE may determine that the size of a DCI field for indicating the specific parameter is the same as the size of a DCI field for indicating the same parameter in Rel-15/16 NR, or may determine that the size is M times as large as the size of the DCI field for indicating the same parameter in Rel-15/16 NR. For example, when M-TRP repetition transmission (or an enhancement of the DCI field for indicating the specific parameter) is configured by higher layer signaling, the UE may determine that the size of the DCI field for indicating the specific parameter is M times as large as the size of the DCI field for indicating the same parameter in Rel-15/16 NR.

A value of M may be defined in a specification in advance, may be configured for the UE by using higher layer signaling, or may be determined based on UE capability. M may be interpreted as the number of TRPs, the number of SRIs, the number of TPMIs, the number of TPC related parameters, and the like.

Note that, in the first embodiment, the UE may be configured/indicated with the number K of repetitions of repetition PUSCHs, and may transmit the repetition PUSCHs to a plurality of (different) TRPs. The number K of repetitions may be configured by RRC, or may be indicated by a MAC CE/DCI.

An RV sequence may be fixed over K repetitions (the same RV may be used), or may recur.

Assumption/configuration of spatial relation may be different for each repetition, or may be different for each RV in a repetition. For example, for the UE, spatial relation of the DMRS of the PUSCH for each repetition/each RV may be configured by RRC, or may be indicated by a MAC CE/DCI. At least one of a repetition index and an RV index may be associated with a TCI state ID.

The repetition PUSCHs may be transmitted based on at least one of a dynamic grant and a configured grant. Note that such details may be applied for other aspects of the present disclosure using the repetition PUSCHs.

With reference to FIGS. 5A to 5D, the DCI field for indicating the specific parameter will be described. Each example shows an example in which the SRI of the repetition PUSCHs is indicated by the SRI field. However, the SRI may be similarly replaced with other parameters, such as a TPMI and a TPC related parameter. Each example shows an example in which codebook-based PUSCH transmission is configured for the UE. However, similar understanding may be reached regarding noncodebook-based PUSCH transmission.

FIGS. 5A to 5D are diagrams to show examples of correspondence between a value of the SRI field and the SRI for PUCCH repetition according to the first embodiment. In each example, SRI #X_i, SRI #Y_i (here, i is a number), and the like may be configured/activated/indicated by higher layer signaling.

FIG. 5A is the correspondence of a case in which the SRI corresponding to usage=codebook of Rel-15 NR is indicated. A value of a certain SRI field corresponds to a single SRI.

FIG. 5B is the correspondence of a case in which the SRI field is configured using 2 bits, which is twice as many as in Rel-15 NR according to the first embodiment. A value of a certain SRI field corresponds to two SRIs. PUSCH #i (i-th PUSCH) (i is an integer) may mean an SRI corresponding to an i-th TRP, or may mean an SRI corresponding to an i-th repetition. PUSCH #i may be interpreted as an i-th SRI. Note that the present disclosure can also be applied to a case in which third and subsequent PUSCHs are defined.

FIG. 5C is the correspondence of a case in which the SRI field is configured using as many bits (1 bit) as in Rel-15 NR according to the first embodiment. A value of a certain SRI field corresponds to two SRIs. In FIG. 5C, a reduced number of sets of SRIs may be expressed in comparison to FIG. 5B, and yet the number of bits of DCI can be prevented from increasing.

FIG. 5D is the correspondence of a case in which the SRI field is configured using as many bits (1 bit) as in Rel-15 NR according to the first embodiment. FIG. 5D is different from FIG. 5C in that PUSCH #1 and PUSCH #2 are not distinguished from each other. In the correspondence of FIG. 5D, regarding SRI #X_i and SRI #Y_i, all of the values may be reported in all cases, or a part of the values may not be reported (in other words, there may be a value of the SRI field corresponding to a single SRI and a value of the SRI field corresponding to a plurality of SRIs).

A set of the specific parameters applied to repetition transmission may be referred to as a sequence (for example, an SRI sequence, a TPMI sequence, or the like).

Number of Repetitions

The number (in the example of FIG. 5B, two) of the specific parameters indicated by the DCI field may be the same as or different from the number of repetitions.

When the number of indicated parameters is the same as the number of repetitions, the indicated parameters may be applied in order from the first repetition (transmission occasion) to the last repetition (in other words, in ascending order of transmission occasions). For example, regarding four repetitions, when {SRI #1, SRI #2, SRI #3, SRI #4} is indicated, the UE may allocate SRI #1, SRI #2, SRI #3, and SRI #4 to the first to fourth repetitions (PUSCHs #1 to #4), respectively (FIG. 6A). Note that, conversely, the indicated parameters may be applied in descending order of transmission occasions.

When the number of indicated parameters is smaller than the number of repetitions, the indicated parameters may be applied to respective repetitions, based on a specific rule. For example, regarding four repetitions, when {SRI #1, SRI #2} is indicated, the UE may allocate SRI #1, SRI #2, SRI #1, and SRI #2 to the first to fourth repetitions (PUSCHs #1 to #4), respectively (FIG. 6B), or may allocate SRI #1, SRI #1, SRI #2, and SRI #2 thereto, respectively.

When the number of indicated parameters is larger than the number of repetitions, the indicated parameters may be applied to respective repetitions, based on a specific rule. For example, regarding two repetitions, when {SRI #1, SRI #2, SRI #3, SRI #4} is indicated, the UE may allocate SRI #1 and SRI #2 to the first to second repetitions, respectively, or may allocate SRI #3 and SRI #4 thereto, respectively.

The UE may not assume a case in which the number of the specific parameters indicated by the DCI field is different from the number of repetitions. In this case, complexity of UE implementation can be reduced.

The UE may determine the number of repetitions, based on the number of the specific parameters indicated by the DCI field. FIG. 7 is a diagram to show an example of determination of the number of repetitions based on the number of specific parameters. In the present example, value of SRI field=0 corresponds to a single SRI (SRI #1), and value of SRI field=1 corresponds to two SRIs (SRIs #1 and #2). In this case, when value of SRI field=0 is indicated, the UE may determine that the number of repetitions is 1, and when value of SRI field=1 is indicated, the UE may determine that the number of repetitions is 2.

Note that, even when the specific parameters are configured/indicated by higher layer signaling instead of DCI, the UE may determine the number of repetitions, based on the number of the specific parameters.

In the first embodiment, the number K of repetitions may be given to the UE with a method similar to that of Rel. 15/16.

Configuration of Higher Layer Signaling and MAC CE

In order to configure and activate a large number of SRS resources corresponding to the SRI field as in the first embodiment, it is preferable that a configuration of higher layer signaling and a MAC CE be studied.

Regarding the configuration of higher layer signaling and the MAC CE for an i-th PUSCH/SRI of the first embodiment, the following aspect may be applied in which the CORESET pool index or the SRS resource set ID is replaced with the i-th PUSCH/SRI in description of the configuration of higher layer signaling related to the CORESET pool index and the MAC CE related to the SRS resource set of a third embodiment to be described below.

For example, in the description of the configuration of higher layer signaling of the third embodiment to be described below, the following details may be used in which CORESET pool index=0 and 1 are respectively replaced with first and second PUSCHs/SRIs. In the description of the MAC CE of the third embodiment to be described below, the following details may be used in which first and second SRS resource sets are respectively replaced with first and second PUSCHs/SRIs.

TPMI

A TPMI indication for the i-th PUSCH described above will be described. The following description will be given by taking an example of a case in which DCI for the first PUSCH and the second PUSCH is indicated for the UE.

As a DCI field for indicating the TPMI, a "precoding information and number of layers" field may be used as in Rel. 15/16, or another field may be used. Here, the DCI field for indicating the TPMI is simply referred to as a TPMI field.

The DCI may include a TPMI field (TPMI field #1) for the first PUSCH and a TPMI field (TPMI field #2) for the second PUSCH (FIG. 8A). According to the configuration, the TPMIs for the first and second PUSCHs can be flexibly indicated.

The DCI may include one TPMI field indicating a TPMI for the first PUSCH and a TPMI for the second PUSCH. According to the configuration, the size of the DCI can be prevented from increasing.

The UE may equally apply one indicated TPMI to each PUSCH.

The UE may apply one indicated TPMI to the first PUSCH, and determine the TPMI to be applied to the second PUSCH, based on a specific rule (for example, by using a certain conversion expression or randomly). According to the configuration, for example, a random precoder can be applied to the second PUSCH.

The UE may apply one indicated TPMI to the first PUSCH, and determine the TPMI to be applied to the second PUSCH, based on the one indicated TPMI. For example, the UE may determine that the TPMI to be applied to the second PUSCH is a value obtained by adding or subtracting an offset value to or from the one indicated TPMI. The offset value may be defined in a specification in advance, may be configured for the UE by using higher layer signaling, may be indicated by using DCI, or may be determined based on UE capability.

The UE may apply one indicated TPMI to the first PUSCH, and determine the TPMI to be applied to the second PUSCH, based on the configuration of the higher layer signaling. This configuration is preferable for a case in which the precoder of the second PUSCH need not be changed, for example.

The UE may determine the TPMI to be applied to each PUSCH, based on correspondence between one indicated value of the TPMI field and the TPMIs to be applied to the first PUSCH and the second PUSCH. The correspondence may be defined in a specification in advance, may be configured for the UE by using higher layer signaling, may be indicated by using DCI, or may be determined based on UE capability. According to the configuration, the size of the DCI can be prevented from increasing, and the TPMI of each PUSCH can be appropriately flexibly indicated.

FIG. 8B is a diagram to show an example of the correspondence. For example, when value of TPMI field=00, the TPMIs corresponding to the first and second PUSCHs are determined as TPMIs #0 and #1, respectively.

According to the first embodiment described above, repetition transmission for the M-TRP can be appropriately performed, based on single-DCI.

Second Embodiment

In a second embodiment, the UE determines spatial relations (UL beams) for the repetition PUSCHs, based on active TCI states regarding a specific downlink channel/downlink reference signal. According to the configuration, beams preferable for DL reception can be used for UL transmission in common.

The specific downlink channel/downlink reference signal may be, for example, at least one of a PDSCH, a PDCCH, a DMRS, a CSI-RS, and the like.

For example, the SRI field included in the DCI for scheduling the repetition PUSCHs may be associated with a set of specific TCI states out of active TCI states for the PDSCH. The specific TCI states may be TCI states corresponding to specific quasi-co-location (QCL) types (for example, QCL type D, QCL type A, and the like).

The set of specific TCI states may correspond to at least one of the following:

(A) a set of TCI states corresponding to N smallest code points out of code points of a TCI field included in the DCI for scheduling the PDSCH, (B) a set of TCI states corresponding to N smallest code points in which at least one DCI code point indicates two or more active TCI states, out of code points of a TCI field included in the DCI for scheduling the PDSCH, (C) a set of TCI states corresponding to N smallest code points in which each DCI code point indicates two or more active TCI states, out of code points of a TCI field included in the DCI for scheduling the PDSCH.

A value of N may be defined in a specification in advance, may be configured for the UE by using higher layer signaling, or may be determined based on UE capability. The N smallest (in other words, from the smallest) code points may be N largest (in other words, from the largest) code points.

The value of N may be the number of SRS resources included in the SRS resource set configured to usage=codebook or noncodebook (for example, in Rel. 15, 2 when usage=codebook, and 4 when usage=noncodebook). In this case, the size of the SRI field can be made common to the DCI for scheduling of the PUSCH for a single TRP and the DCI for scheduling of the PUSCH for the M-TRP.

The UE may determine the spatial relations (UL beams) for the repetition PUSCHs, based on one or a plurality of TCI states selected with a value of the SRI field out of the set of specific TCI states. According to such a configuration, the best TCI state(s) can be applied to the repetition PUSCHs as the SRI without additionally performing higher layer control for the PUSCHs. This is based on that it is considered that M-TRP repetitions of the PUSCH and the PDSCH have close use cases, and that it is expected that the best TCI state(s) are configured for a TCI state list for the PDSCH.

Figure 9A:
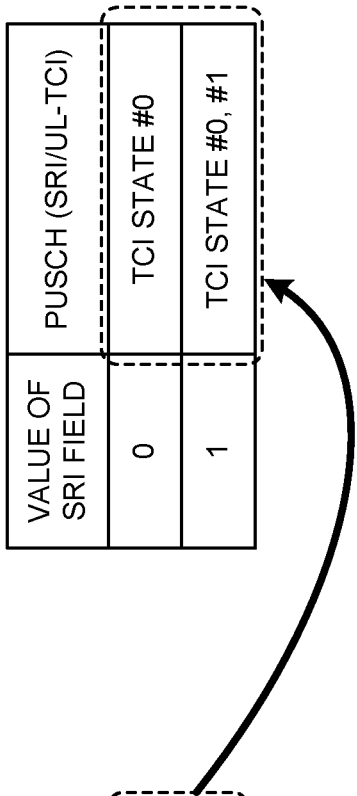
FIGS. 9A and 9B are diagrams to show examples of determination of UL beams for repetition PUSCHs according to a second embodiment.
Figure 9B:
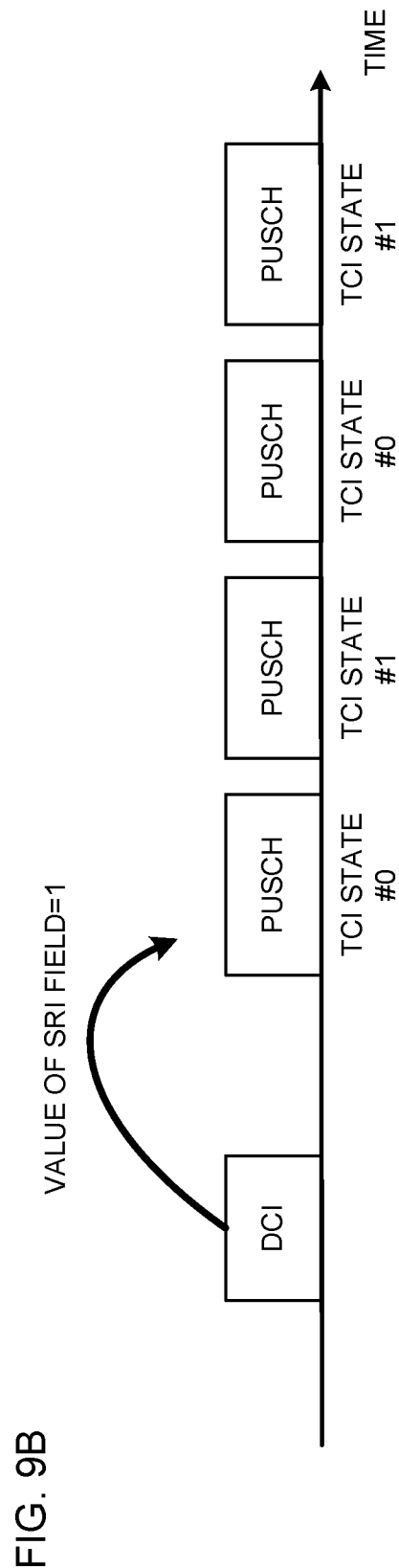

FIGS. 9A and 9B are diagrams to show examples of determination of UL beams for the repetition PUSCHs according to the second embodiment. The left side of FIG. 9A shows correspondence between a value of the TCI field of the DCI (for example, DCI format 1_1) for scheduling the PDSCH and indicated TCI state(s) out of the active TCI states. For example, TCI field=000 indicates one TCI state (TCI state #0), and TCI field=001 indicates two TCI states (TCI states #0 and #1).

When (A) or (B) described above is employed with N=2 described above, the set of specific TCI states is a set of TCI states corresponding to two smallest code points (000, 001) (one is {TCI state #0} and the other is {TCI states #0 and #1}). The right side of FIG. 9A shows an example in which the set of specific TCI states is associated with values of the SRI field in ascending order. Note that association between the set of specific TCI states and the values of the SRI field is not limited thereto, and may be associated in descending order, for example.

When the association of FIG. 9A is implemented and value of SRI field=1 of the DCI (for example, DCI format 0_1) for scheduling the repetition PUSCHs is indicated as in FIG. 9B, the UE applies beams based on the repetition PUSCHs {TCI states #0 and #1}. Note that, when the number of indicated parameters (the number of SRIs, the number of TCIs) is the same as or different from the number of repetitions, as described in the first embodiment, the UE may determine which parameter is applied to each repetition.

Note that the aspect of deriving correspondence of the SRI field from the list of TCI states for the PDSCH as described in FIG. 9A may be applied only in a case of single-DCI-based M-TRP. In other words, when at least one of code points of the TCI field indicates two or more active TCI states, the aspect of deriving correspondence of the SRI field from the list of TCI states for the PDSCH as described in FIG. 9A may be used.

When the UE does not/cannot derive correspondence of the SRI field from the list of TCI states for the PDSCH, the correspondence of the SRI field (for example, the correspondence between the value of the SRI field and the SRI/UL-TCI) may be defined in a specification in advance, or may be configured by higher layer signaling.

When the UE does not/cannot derive correspondence of the SRI field from the list of TCI states for the PDSCH, the UE may assume that no repetition PUSCHs over the M-TRP is expected (configured), or may transmit the repetition PUSCHs based on the same SRI as in Rel. 15/16.

Note that, even when the UE does/can derive correspondence of the SRI field from the list of TCI states for the PDSCH, if the correspondence of the SRI field (for example, the correspondence between the value of the SRI field and the SRI/UL-TCI) is configured by higher layer signaling, the UE may conform to (may prioritize) the configuration of the higher layer signaling.

According to the second embodiment described above, transmit beams of the PUSCHs can be determined based on preferable DL beams.

Third Embodiment

A third embodiment will describe a case in which the multi-DCI is used for the M-TRP. In this case, for the UE, at least one CORESET whose CORESET pool index (RRC parameter "CORESETPoolIndex") has one or more values is configured.

Note that the third embodiment is not limited to the repetition PUSCHs. When the repetition PUSCHs are used, the following contents may be applied in combination with the first and second embodiments described above.

In specifications of Rel-16 NR thus far, the SRI in the same SRS resource set corresponds to a value of the SRI field of the DCI format detected for each value of the CORESET pool index (for each CORESET). Thus, it has hitherto been difficult to change a UL beam indication for each CORESET.

In view of this, in the third embodiment, the SRI (spatial relation) of the PUSCH for each TRP (for each CORESET pool index) is configured for the UE using higher layer signaling.

FIGS. 10A and 10B are diagrams to show examples of correspondence of the SRI field for each CORESET pool index according to the third embodiment. FIG. 10A shows correspondence of the SRI field of the DCI detected in the CORESET configured to CORESET pool index=0 or in which the CORESET pool index is not configured. FIG. 10B shows correspondence of the SRI field of the DCI detected in the CORESET configured to CORESET pool index=1.

Note that, in the present disclosure, "configured to CORESET pool index=0" may be hereinafter interchangeably interpreted as "configured to CORESET pool index=0 or the CORESET pool index is not configured".

Regarding the PUSCH scheduled via the CORESET configured to CORESET pool index=0, the UE refers to the SRI (SRI #0_0, SRI #0_1) configured for the CORESET by using higher layer signaling as in FIG. 10A to determine the SRI.

Regarding the PUSCH scheduled via the CORESET configured to CORESET pool index=1, the UE refers to the SRI (SRI #1_0, SRI #1_1) configured for the CORESET by using higher layer signaling as in FIG. 10B to determine the SRI.

Configuration of Higher Layer Signaling

In Rel. 15, the number of SRS resource sets with usage=codebook (CB) is at most 1, the number of SRS resources included in the SRS resource set with usage=codebook is at most 2, the number of SRS resource sets with usage=noncodebook (NCB) is at most 1, and the number of SRS resources included in the SRS resource set with usage=noncodebook is at most 4.

Thus, in the configuration of the SRI for each TRP (for each CORESET pool index) described above, the limit to the number of SRS resources or the number of SRS resource sets needs to be eliminated (or lowered).

Each of the following embodiments will be described.
Embodiment 3.1: The number of SRS resource sets is defined to be at most P, and the number of SRS resources for each SRS resource set is defined to be at most 2,
Embodiment 3.2: The number of SRS resource sets is defined to be at most 1, and the number of SRS resources for each SRS resource set is defined to be at most 2P,
Embodiment 3.3: The number of SRS resource sets has no limit, and the number of SRS resources for each SRS resource set is defined to be at most 2P.

Here, a value of P may correspond to the number of TRPs, or may correspond to different numbers of CORESET pool indices configured for the UE (or the largest CORESET pool index configured for the UE+1). For example, when the CORESET of CORESET pool index=1 is configured, P may be 2. The value of P is, as a matter of course, not limited to 2.

Note that, in Embodiments 3.1 to 3.3, unless otherwise noted, the SRS resource sets and the SRS resources with usage=CB will be described presupposing P=2. However, the SRS resource sets and the SRS resources with usage=CB may be replaced with the SRS resource sets and the SRS resources with usage=NCB or with another usage. For example, when the SRS resource sets and the SRS resources with usage=CB are replaced with the SRS resource sets and the SRS resources with usage=NCB, the number of SRS resource sets may be the same value, whereas the number of SRS resources for each SRS resource set may be replaced with a value twice as large as the number of SRS resources with usage=CB (for example, 4 in Embodiment 3.1, and 4P in Embodiments 3.2 to 3.3).

Embodiment 3.1

In Embodiment 3.1, one SRS resource set corresponds to one TRP (CORESET pool index). Correspondence between the CORESET pool indices and the SRS resource set IDs may be explicitly configured using higher layer signaling, or CORESET pool index=0, 1, . . . may be associated with the SRS resource set IDs from the smallest. Note that "from the smallest" in the present disclosure may be interchangeably interpreted as "from the largest".

Figure 11A:
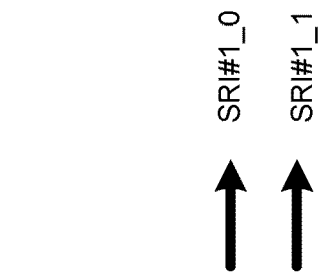
FIGS. 11A and 11B are diagrams to show examples of a configuration of SRS resource sets and SRS resources according to Embodiment 3.1.
Figure 11B:
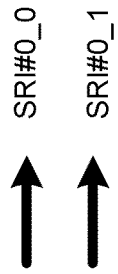

FIGS. 11A and 11B are diagrams to show examples of a configuration of the SRS resource sets and the SRS resources according to Embodiment 3.1. FIG. 11A shows the SRS resources associated with SRS resource set ID=0, and FIG. 11B shows the SRS resources associated with SRS resource set ID=1.

Here, SRS #x_y may mean the SRS resource of a y {or (y+1)}-th entry of SRS resource set ID=x (the same holds true for the following figures). The SRS resource set IDs and the SRS resource IDs shown in the figures are merely examples, and these values are not restrictive (the same holds true for the following figures).

SRS resource set ID=0 may be used for indication of the SRI of the CORESET configured with CORESET pool index=0. SRS resource set ID=1 may be used for indication of the SRI of the CORESET configured with CORESET pool index=1.

In the present example, SRI #0_0 and SRI #0_1 shown in FIG. 10A may be SRS #0_0 (SRS resource corresponding to SRS resource ID=0) and SRS #0_1 (SRS resource corresponding to SRS resource ID=1), respectively.

SRI #1_0 and SRI #1_1 shown in FIG. 10B may be SRS #1_0 (SRS resource corresponding to SRS resource ID=2) and SRS #1_1 (SRS resource corresponding to SRS resource ID=2), respectively.

Embodiment 3.2

In Embodiment 3.2, W SRS resources included in one SRS resource set correspond to one TRP (CORESET pool index). Correspondence between the CORESET pool indices and the SRS resource IDs may be explicitly configured using higher layer signaling, or CORESET pool index=0, 1, . . . may be associated with the SRS resource IDs for every W SRS resource IDs from the smallest.

Note that a value of W may be the number of SRS resources determining the size of the SRI field of the DCI, and may be, for example, a value obtained by applying a floor function or a roof function to a value obtained by dividing the number of SRS resources in the SRS resource set with usage=CB/NCB by P.

Figure 12:
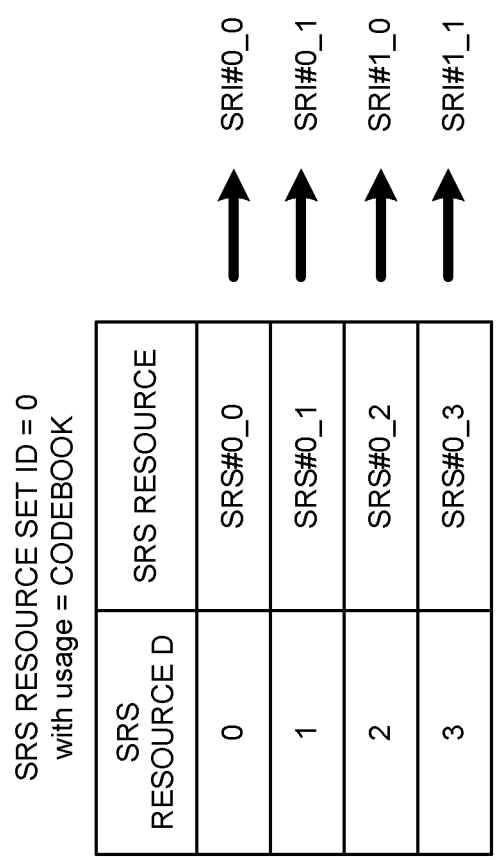
FIG. 12 is a diagram to show an example of a configuration of the SRS resource sets and the SRS resources according to Embodiment 3.2.

FIG. 12 is a diagram to show an example of a configuration of the SRS resource sets and the SRS resources according to Embodiment 3.2. FIG. 12 shows the SRS resources associated with SRS resource set ID=0. The SRS resource set of SRS resource set ID=0 in the present example is associated with 2P=four SRS resources. In this case, W=2.

Of SRS resource set ID=0, W=two SRS resources, from the smallest, may be used for indication of the SRI of the CORESET configured with CORESET pool index=0. Of SRS resource set ID=0, W=two SRS resources, from the second smallest, may be used for indication of the SRI of the CORESET configured with CORESET pool index=1.

In the present example, SRI #0_0 and SRI #0_1 shown in FIG. 10A may be SRS #0_0 (SRS resource corresponding to SRS resource ID=0) and SRS #0_1 (SRS resource corresponding to SRS resource ID=1), respectively.

SRI #1_0 and SRI #1_1 shown in FIG. 10B may be SRS #0_2 (SRS resource corresponding to SRS resource ID=2) and SRS #0_3 (SRS resource corresponding to SRS resource ID=3), respectively.

Embodiment 3.3

In Embodiment 3.3, W SRS resources included in one or a plurality of SRS resource sets correspond to one TRP (CORESET pool index). Correspondence between the CORESET pool indices, the SRS resource set IDs, and the SRS resource IDs may be explicitly configured using higher layer signaling. Regarding the correspondence, CORESET pool index=0, 1, . . . may be associated with the SRS resource set IDs from the smallest and the SRS resource IDs for every W SRS resource IDs from the smallest.

Note that a value of W may be the number of SRS resources determining the size of the SRI field of the DCI, and may be, for example, a value obtained by applying a floor function or a roof function to a value obtained by dividing the number of SRS resources in the SRS resource set with usage=CB/NCB by P.

In Embodiment 3.3, configuration of the SRS resources corresponding to a certain CORESET pool index across a plurality of SRS resource sets may be permitted. In other words, the UE may determine that the SRS resources configured across a plurality of SRS resource sets correspond to the same CORESET pool index.

FIGS. 13A and 13B are diagrams to show examples of a configuration of the SRS resource sets and the SRS resources according to Embodiment 3.3. FIG. 13A shows the SRS resources associated with SRS resource set ID=0, and FIG. 13B shows the SRS resources associated with SRS resource set ID=1. In the present example, at most 2P=four SRS resources can be associated for each SRS resource set. In FIG. 13A, three SRS resources are associated, and in FIG. 13B, one SRS resource is associated. In the present example, W=2.

Of SRS resource set ID=0, W=two SRS resources, from the smallest, may be used for indication of the SRI of the CORESET configured with CORESET pool index=0. Because there is only one remaining SRS resource of SRS resource set ID=0, a total of W=two SRS resources, i.e., the one SRS resource and one SRS resource of SRS resource set ID=1, may be used for indication of the SRI of the CORESET configured with CORESET pool index=1.

In the present example, SRI #0_0 and SRI #0_1 shown in FIG. 10A may be SRS #0_0 (SRS resource corresponding to SRS resource ID=0) and SRS #0_1 (SRS resource corresponding to SRS resource ID=1), respectively.

SRI #1_0 and SRI #1_1 shown in FIG. 10B may be SRS #0_2 (SRS resource corresponding to SRS resource ID=2) and SRS #1_0 (SRS resource corresponding to SRS resource ID=3), respectively.

MAC CE

Update of spatial relation corresponding to the SRI according to the third embodiment will be described.

For the UE, reference signal resources used for derivation of spatial relations of SRS resources included in a certain SRS resource set may be activated using the MAC CE. Such activation may be referred to as update (or overriding) of the spatial relations (SRIs) corresponding to the SRS resources. Note that, in the present disclosure, activate, deactivate, indicate, select, update, determine, and the like may be interchangeably interpreted.

The UE may assume that the UE applies, regarding the SRS resources indicated by the DCI, the spatial relations (SRIs) activated by the MAC CE described above to transmission of a certain signal/channel (for example, a PUSCH, an SRS).

Figures 14A, 14B:
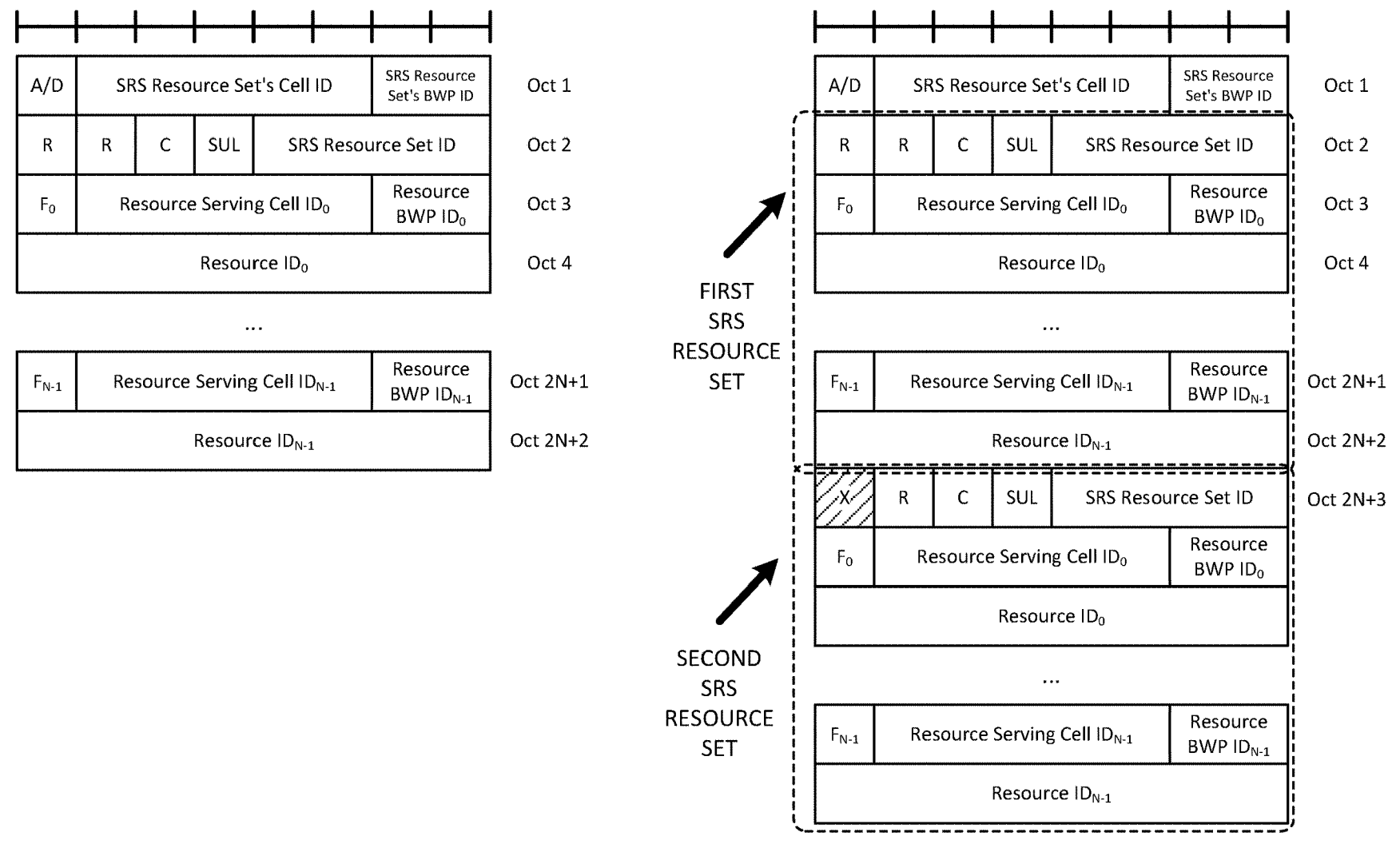

FIGS. 14A and 14B are diagrams to show examples of the MAC CE for update of spatial relation of SRSs according to the third embodiment.

FIG. 14A shows an example of the MAC CE that can be used for update of SRS resource-level spatial relation regarding one SRS resource set. The MAC CE is an enhanced SP/AP SRS spatial relation indication MAC CE defined in Rel-16 NR.

The MAC CE may include information indicating activation or deactivation ("A/D" field), a cell ID for identifying a cell including an SRS resource set to be activated, a BWP ID corresponding to a UL bandwidth part (BWP) including an SRS resource set to be activated, a P-SRS resource set ID to be activated, a carrier to be activated ("SUL" field), a reference signal resource ID corresponding to a spatial relation of an SRS resource, and the like. The MAC CE may include a serving cell ID, a BWP ID, and the like corresponding to a reference signal resource ID (whether or not the MAC CE includes these may be indicated by a "C" field). Note that "R" represents a reserved field.

The reference signal resource ID for an i-th SRS resource in the SRS resource set corresponds to "Resource $ID_i$". Note that the reference signal resource ID may be, for example, at least one of a non-zero power CSI-RS resource index, an SSB index, an SRS resource ID, a CORESET ID, and the like.

$F_i$ may be used for identifying to which reference signal (for example, a CSI-RS, an SSB, an SRS (a P-SRS, an SP-SRS, an A-SRS), or a CORESET) "Resource $ID_i$" corresponds. To which reference signal "Resource $ID_i$" corresponds may be determined based on a combination of $Fi_i$ and a specific bit of "Resource $ID_i$" itself.

The MAC CE of FIG. 14A can be applied to at least one (for example, all) of the SRS resource sets with usage of codebook, noncodebook, beam management, and antenna switching.

FIG. 14B shows an example of the MAC CE that can be used for update of SRS resource-level spatial relation regarding a plurality of SRS resource sets. The MAC CE is similar to that of FIG. 14A, but is different in that the MAC CE includes a plurality of configurations similar to octets (Octs) 2 to 2N+2 of FIG. 14A. In each octet set, SRS resource-level spatial relation regarding a different SRS resource set may be indicated.

Note that, in FIG. 14B, information regarding two SRS resource sets is included, but three or more SRS resource sets may be included.

An X field (shown in Oct 2N+3) in the figure may indicate whether or not a spatial relation indication of more than one SRS resource set is included. For example, X=1 may mean that there is a field thereafter (for example, after Oct 2N+4), and X=0 may mean that there is not a field thereafter.

Note that the X field may be present in Oct 2 (for example, located in the upper left R field). In this case, regarding the X field, for example, X=1 may mean that there is a field subsequent to a spatial relation indication of the SRS resource set (for example, after Oct 2N+3), and X=0 may mean that there is not a subsequent field.

The X field may not be explicitly defined.

Octets (for example, Oct 2N+3, Oct 2) including an SRS resource set ID field may be omitted. When the UE determines that the MAC CE includes information sets of spatial relation indications corresponding to a plurality of SRS resource sets, the UE may assume that these information sets are applied from the information set having the smallest SRS resource set ID.

A part of fields (or octets) for the second SRS resource set may not be included. In this case, it may be determined that a value of a field not included (not reported) is the same as a value that is reported/configured previously (in the past) for the second SRS resource set (the value is maintained or is not updated). It may be determined that the value of the field not included (not reported) is the same as a value that is reported/configured for the first SRS resource set in the same MAC CE. According to these configurations, overhead of the MAC CE can be prevented from increasing.

Supplement to Third Embodiment

The limit to the number of SRS resources and the number of SRS resource sets of Rel. 15 described above may be used in a case satisfying at least one of a case in which any RRC parameter for a specific release (for example, Rel. 17) is not configured for the UE, and a case in which the CORESET pool index (CORESET pool index of a different value or CORESET pool index=1) is not reported. Otherwise, the number of SRS resources and the number of SRS resource sets of at least one of Embodiments 3.1 to 3.3 may be applied.

Note that the third embodiment has described the SRI. However, the SRI may be similarly replaced with other parameters, such as a TPMI, a UL beam parameter, and a TPC related parameter. These parameters (or correspondence between these parameters and the DCI field) may be configured/indicated/determined for each TRP (CORESET pool index).

At least one in the third embodiment may be applied only to the UE that has reported specific UE capability or that supports the specific UE capability.

The specific UE capability may indicate at least one of the following:
whether or not association of the SRI for each CORESET pool (or CORESET pool index) is supported,
maximum number of supported CORESET pools (or CORESET pool indices),
maximum number of supported SRS resource sets (or maximum number of supported SRS resource sets with specific usage),
maximum number of supported SRS resources (or maximum number of supported SRS resources with specific usage).

According to the third embodiment described above, spatial relations for the M-TRP can be appropriately determined based on the multi-DCI.

Fourth Embodiment

A fourth embodiment will describe a case in which the multi-DCI is used for the M-TRP. The fourth embodiment is not limited to the repetition PUSCHs.

A case is considered in which DCI 1 and DCI 2 for respectively scheduling the PUSCHs are detected in different CORESETs.

When DCI 1 and DCI 2 are related to the same HARQ process ID (or HARQ process number) and indicate the same new data indicator (NDI) field value, and the UE receives, before a PUSCH scheduled by DCI 1, DCI 2 for scheduling another PUSCH, the UE may transmit the same transport block (TB) in all of these PUSCHs. In this case, for example, the PUSCHs of the same TB can be transmitted (retransmitted, repeatedly transmitted) at short intervals by using different beams.

The operation may be permitted only when DCI 1 and DCI 2 are detected in CORESETs having different CORESET pool indices, or may be permitted regardless of whether the CORESET pool indices are different.

The operation may be permitted only when one of or both of DCI 1 and DCI 2 schedule the repetition PUSCHs, or may be permitted also when both of them schedule the PUSCH without repetitions.

Figure 15:
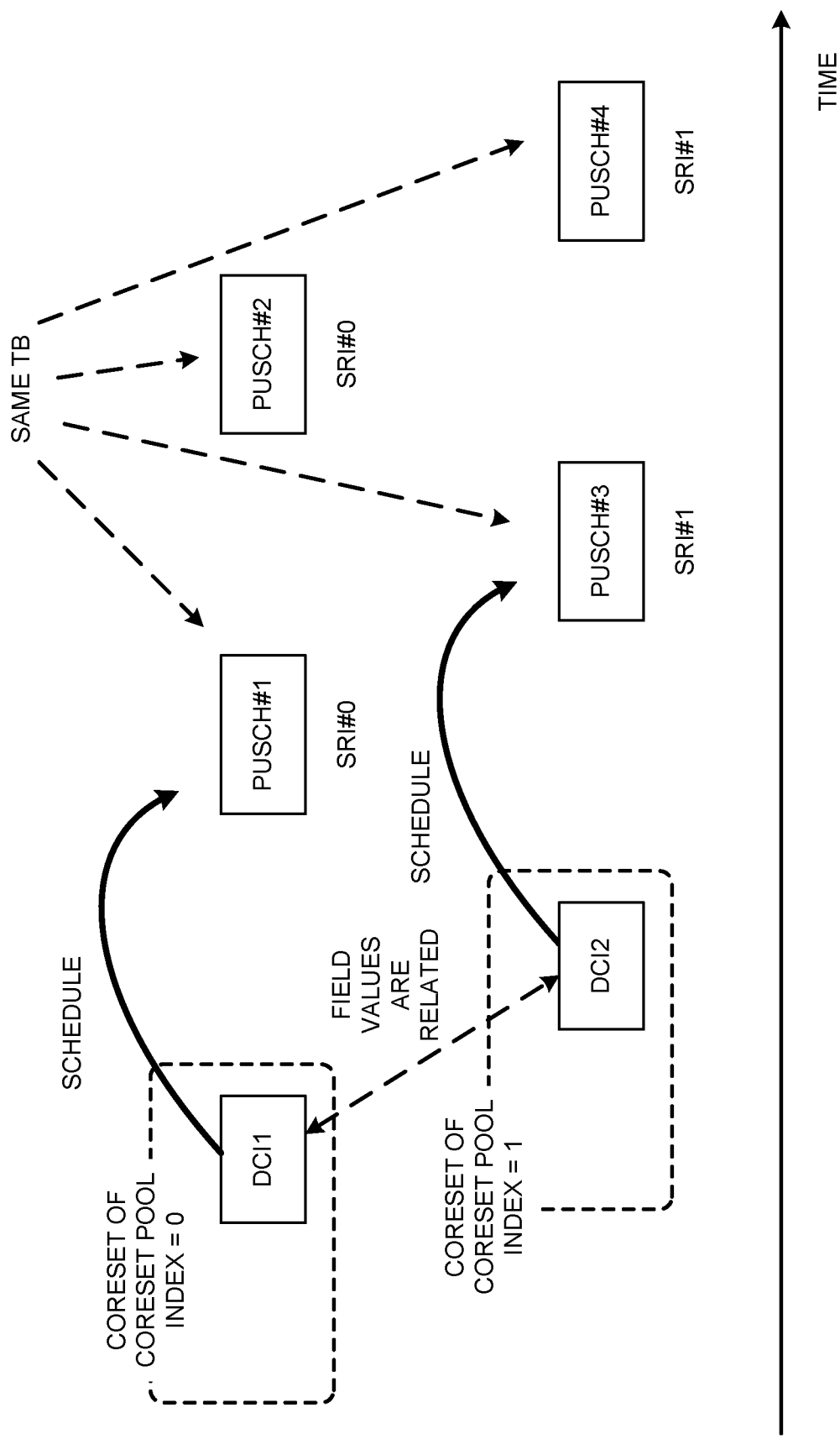
FIG. 15 is a diagram to show an example of transmission of the same TB based on multi-DCI according to a fourth embodiment.

FIG. 15 is a diagram to show an example of transmission of the same TB based on the multi-DCI according to the fourth embodiment. Regarding DCI 1 and DCI 2 shown in the figure, values of an HARQ process number field and an NDI field are related (for example, the same). In the present example, DCI 1 schedules the repetition PUSCHs (PUSCHs #1 and #2) using SRI #0. DCI 2 schedules the repetition PUSCHs (PUSCHs #3 and #4) using SRI #1.

The UE detects DCI 1 in the CORESET of CORESET pool index=0. The UE detects DCI 2 in the CORESET of CORESET pool index=1 after receiving DCI 1 and before starting to transmit PUSCH #1.

In the example, the UE transmits the same TB in PUSCHs #1 to #4. Substantially, more than two times of repetition transmission, two being the original number of repetitions, can be implemented using different SRIs.

Next, a case is considered in which DCI 1 and DCI 2 for triggering respective PUSCHs are detected in different CORESETs. Note that the PUSCHs (uplink control information (UCI)) triggered by these DCIs may each be, for example, a Hybrid Automatic Repeat reQuest ACKnowledgement (HARQ-ACK) for the PDSCH, an aperiodic CSI report, or the like.

When DCI 1 and DCI 2 each have a specific DCI field, the UE may transmit the same UCI as the UCI transmitted using the PUCCH triggered by DCI 1, by using the PUCCH triggered by DCI 2. In this case, for example, the PUCCHs of the same UCI can be transmitted (retransmitted, repeatedly transmitted) at short intervals by using different beams.

Note that the specific DCI fields may each be a field for indicating transmission of the same UCI, or may be another field. Values of the specific DCI fields of DCIs 1 and 2 may be assumed to be obligatorily the same, or may be assumed that such values may be different from each other. For example, the specific DCI fields may each be a TCI field, and when values of the TCI fields are different in DCIs 1 and 2, the operation may be permitted.

The operation may be permitted only when DCI 1 and DCI 2 are detected in CORESETs having different CORESET pool indices, or may be permitted regardless of whether the CORESET pool indices are different.

The operation may be permitted only when one of or both of DCI 1 and DCI 2 trigger the repetition PUCCHs, or may be permitted also when both of them trigger the PUCCH without repetitions.

The operation may be permitted when the UE receives, before a PUCCH triggered by DCI 1, DCI 2 for triggering another PUCCH. The operation may be permitted when the UE receives, after a PUCCH triggered by DCI 1, DCI 2 for triggering another PUCCH.

Figure 16:
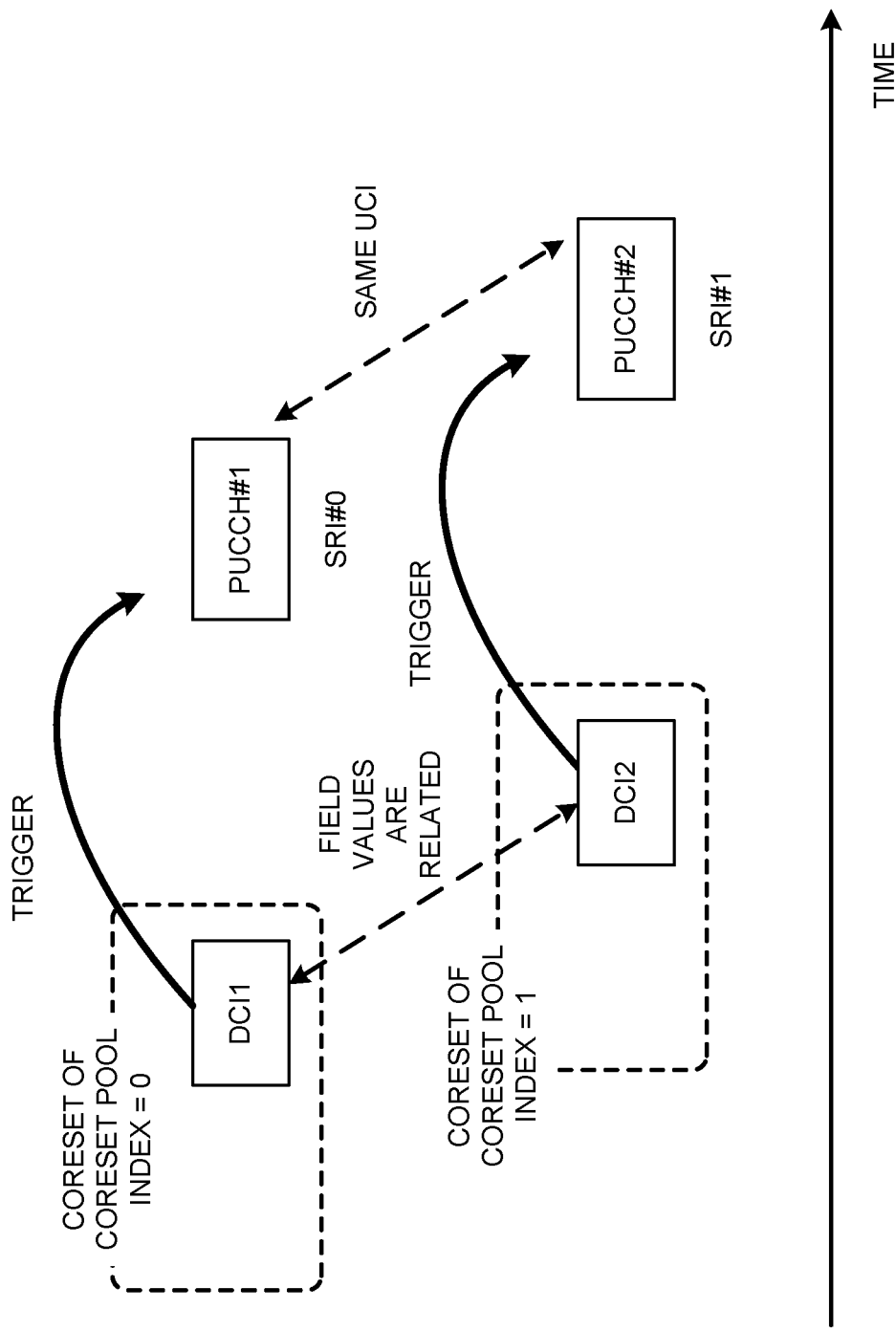
FIG. 16 is a diagram to show an example of transmission of the same UCI based on multi-DCI according to the fourth embodiment.

FIG. 16 is a diagram to show an example of transmission of the same UCI based on the multi-DCI according to the fourth embodiment. Regarding DCI 1 and DCI 2 shown in the figure, values of the specific DCI fields are related (for example, the same). In the present example, DCI 1 triggers PUCCH #1 using SRI #0 (spatial relation #0). DCI 2 triggers PUCCH #2 using SRI #1 (spatial relation #1).

The UE detects DCI 1 in the CORESET of CORESET pool index=0. The UE detects DCI 2 in the CORESET of CORESET pool index=1 after receiving DCI 1 and before starting to transmit PUCCH #1.

In the present example, the UE transmits the same UCI on PUCCHs #1 to #2. Substantially, PUCCH repetition transmission can be implemented using different SRIs.

For example, the UE may transmit the HARQ-ACK for the PDSCH scheduled by DCI 1 on PUCCH #1 and transmit the same HARQ-ACK on PUCCH #2 as well.

Note that, on PUCCH #2, the UE may transmit only the UCI of PUCCH #1, or may transmit UCI at least including the UCI of PUCCH #1 (for example, UCI whose transmission is triggered by DCI 2, in addition to the UCI of PUCCH #1).

Resource of PUCCH #2 may be controlled (indicated) by DCI 2, may be derived from resources of PUCCH #1, or may be controlled by a combination of DCI 1 and DCI 2.

According to the fourth embodiment described above, transmission of the same TB/UCI for the M-TRP can be appropriately determined based on the multi-DCI.

Others

At least one of the embodiments described above may be applied only to the UE that has reported specific UE capability or that supports the specific UE capability.

The specific UE capability may indicate at least one of the following:

whether or not PUSCH repetitions are supported,
whether or not different spatial relations for PUSCH repetitions are supported,
whether or not PUCCH repetitions are supported,
whether or not different spatial relations for PUCCH repetitions are supported,
number (or maximum number) of supported repetitions or spatial relations.

At least one of the embodiments described above may be applied when the UE is configured with specific information related to the embodiments described above by higher layer signaling (when not configured, operation of Rel. 15/16 is applied, for example). For example, the specific information may be information indicating enabling of different spatial relations for the PUSCH repetitions, any RRC parameter for a specific release (for example, Rel. 17), or the like.

Note that each of the embodiments described above may be applied when the UE is, or is not, configured with (operation of) the multi-TRP or the multi-panel.

Radio Communication System

Hereinafter, a structure of a radio communication system according to one embodiment of the present disclosure will be described. In this radio communication system, the radio communication method according to each embodiment of the present disclosure described above may be used alone or may be used in combination for communication.

Figure 17:
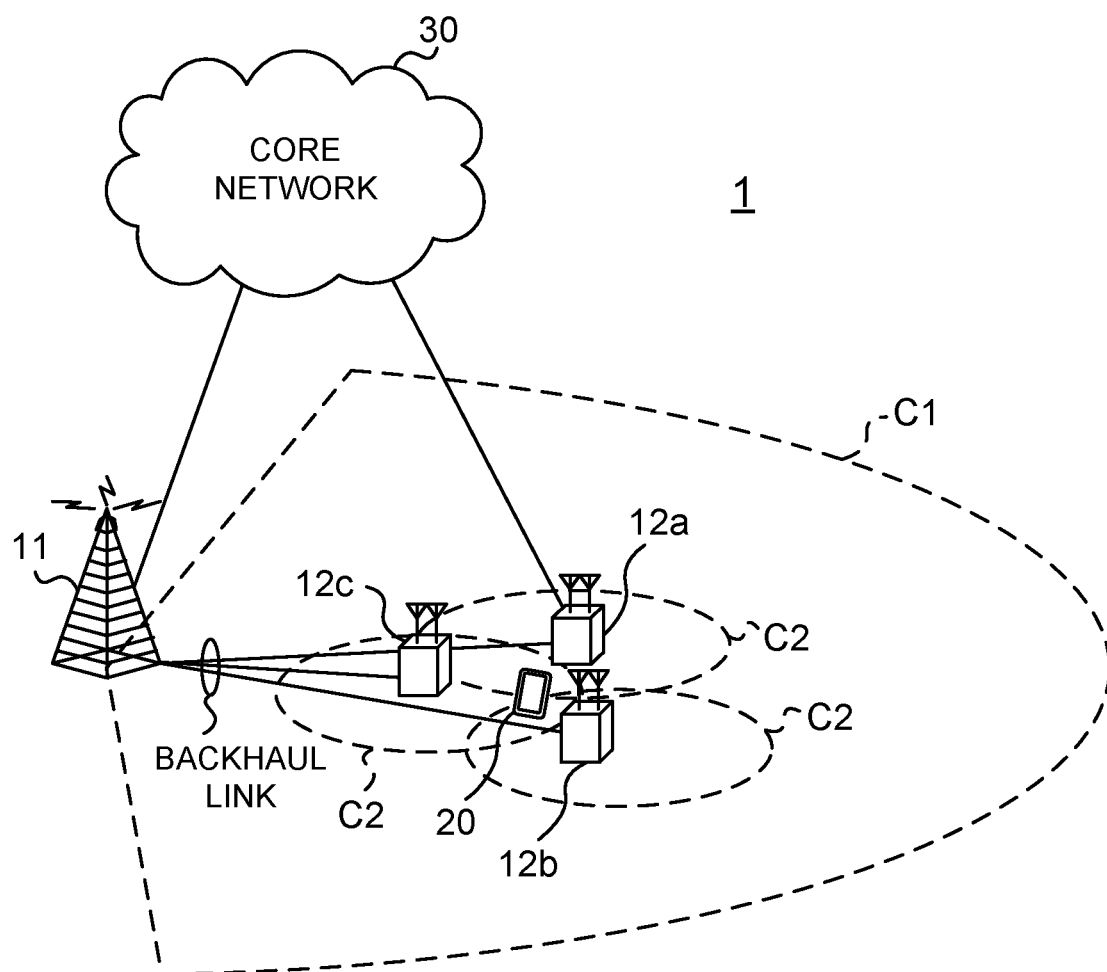
FIG. 17 is a diagram to show an example of a schematic structure of a radio communication system according to one embodiment.

FIG. 17 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

Base Station

Figure 18:
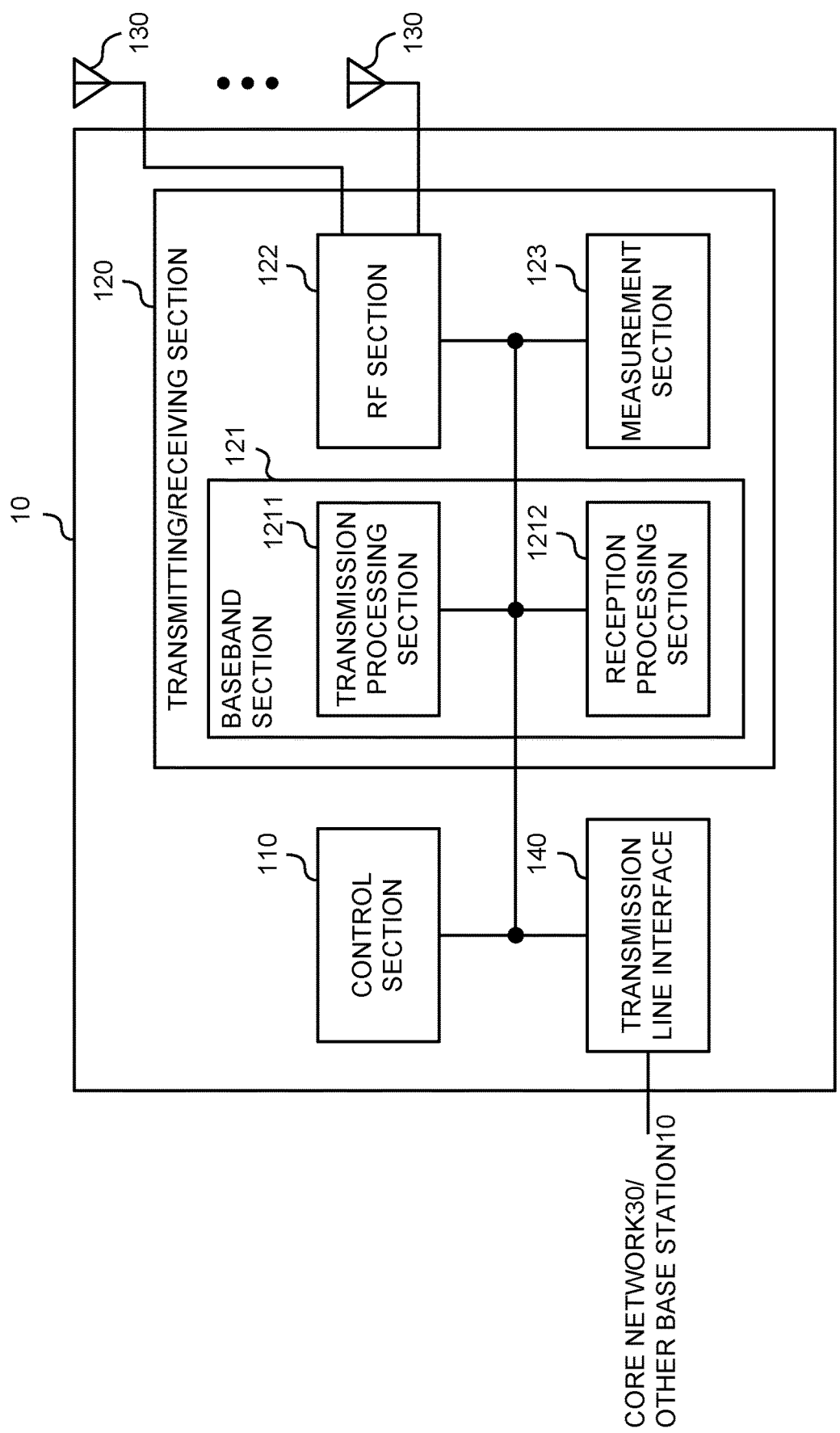
FIG. 18 is a diagram to show an example of a structure of a base station according to one embodiment.

FIG. 18 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

Note that the transmitting/receiving section 120 may transmit, to the user terminal 20, a single downlink control information (DCI) (single-DCI) used for determination of spatial relation information for a plurality of uplink shared channels (Physical Uplink Shared Channels (PUSCHs)).

The transmitting/receiving section 120 may receive the plurality of PUSCHs transmitted by the user terminal 20 by using a spatial domain transmission filter based on the spatial relation information.

The transmitting/receiving section 120 may transmit, to the user terminal 20, information related to correspondence between a value of a reference signal for measurement (Sounding Reference Signal (SRS)) resource indicator (SRS Resource Indicator (SRI)) field of downlink control information (DCI) detected and spatial relation information for each control resource set (CORESET) pool index.

The control section 110 may assume that the user terminal 20, in determining the spatial relation information for an uplink shared channel (Physical Uplink Shared Channel (PUSCH)) based on the DCI detected in a CORESET corresponding to a certain CORESET pool index, refers to the correspondence regarding the CORESET pool index to determine the spatial relation information for the PUSCH, and may receive the plurality of PUSCHs transmitted by the user terminal 20 by using a spatial domain transmission filter based on the spatial relation information.

User Terminal

Figure 19:
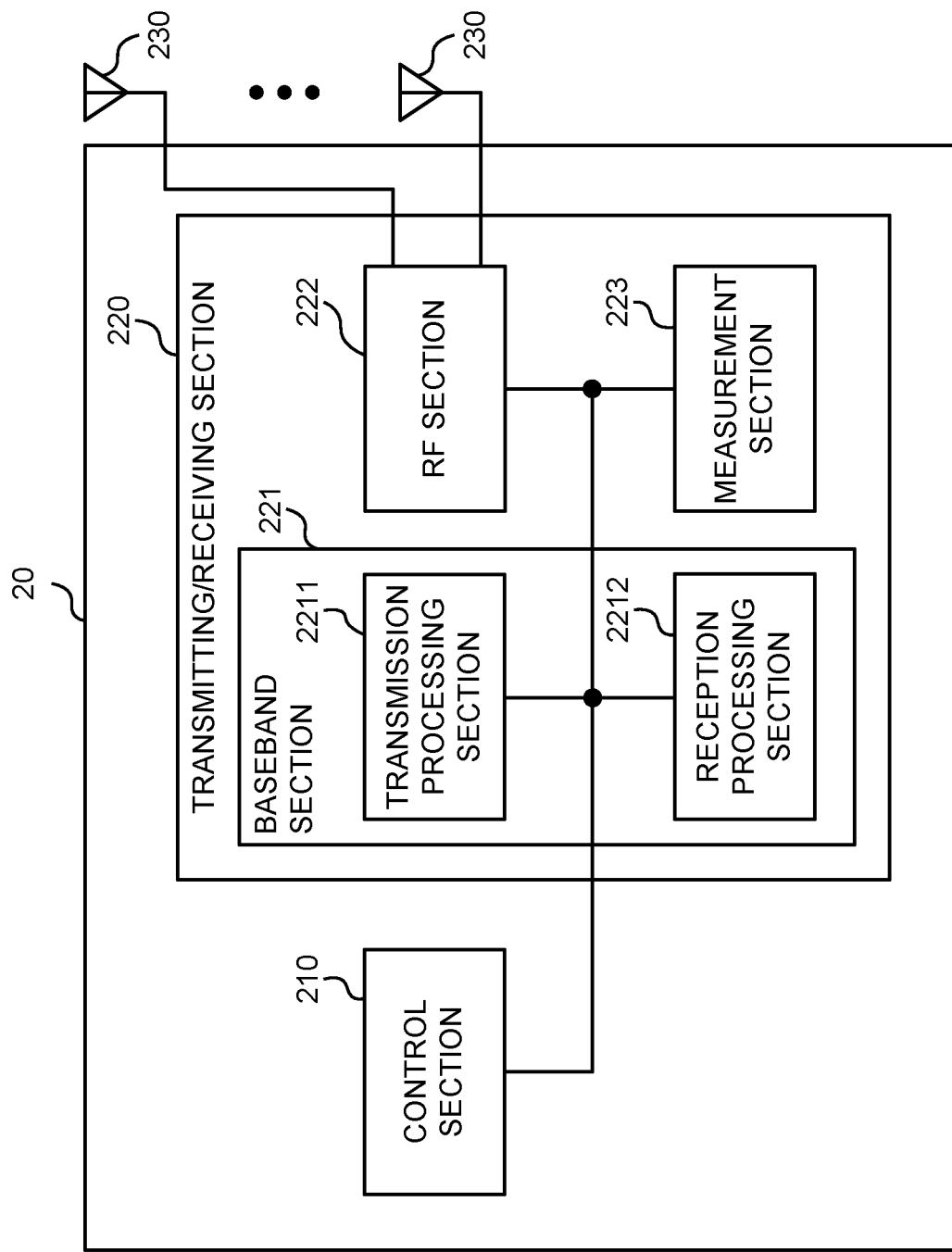
FIG. 19 is a diagram to show an example of a structure of a user terminal according to one embodiment.

FIG. 19 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211 and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the control section 210 may determine spatial relation information for a plurality of uplink shared channels (Physical Uplink Shared Channels (PUSCHs)) by using a single downlink control information (DCI).

The transmitting/receiving section 220 may transmit the plurality of PUSCHs by using a spatial domain transmission filter based on the spatial relation information.

The control section 210 may determine the spatial relation information, based on a reference signal for measurement (Sounding Reference Signal (SRS)) resource indicator (SRS Resource Indicator (SRI)) field of the DCI with number of bits being enhanced based on Radio Resource Control (RRC) signaling.

The control section 210 may determine the number of plurality of PUSCHs for the number of SRIs corresponding to a value of the SRI field.

The control section 210 may determine the spatial relation information out of a set of specific transmission configuration indication (TCI) states out of active TCI states, based on one or a plurality of TCI states selected with a value of a reference signal for measurement (Sounding Reference Signal (SRS)) resource indicator (SRS Resource Indicator (SRI)) field of the DCI.

The transmitting/receiving section 220 may receive information related to correspondence between a value of a reference signal for measurement (Sounding Reference Signal (SRS)) resource indicator (SRS Resource Indicator (SRI)) field of downlink control information (DCI) detected and spatial relation information for each control resource set (CORESET) pool index.

The control section 210 may, in determining the spatial relation information for an uplink shared channel (Physical Uplink Shared Channel (PUSCH)) based on the DCI detected in a CORESET corresponding to a certain CORESET pool index, refer to the correspondence regarding the CORESET pool index to determine the spatial relation information for the PUSCH.

The control section 210 may determine that, provided that the number of different CORESET pool indices configured is P, the number of configured SRS resource sets with specific usage is at most P, and the number of SRS resources for each of the configured SRS resource sets is at most 2.

The control section 210 may determine that, provided that the number of different CORESET pool indices configured is P, the number of configured SRS resource sets with specific usage is at most 1, and the number of SRS resources for each of the configured SRS resource sets is at most 2P.

The control section 210 may determine that SRS resources configured across a plurality of SRS resource sets correspond to the same CORESET pool index.

Hardware Structure

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one apparatus that is physically or logically coupled, or may be realized by directly or indirectly connecting two or more physically or logically separate pieces of apparatus (for example, via wire, wireless, or the like) and using these plurality of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 20:
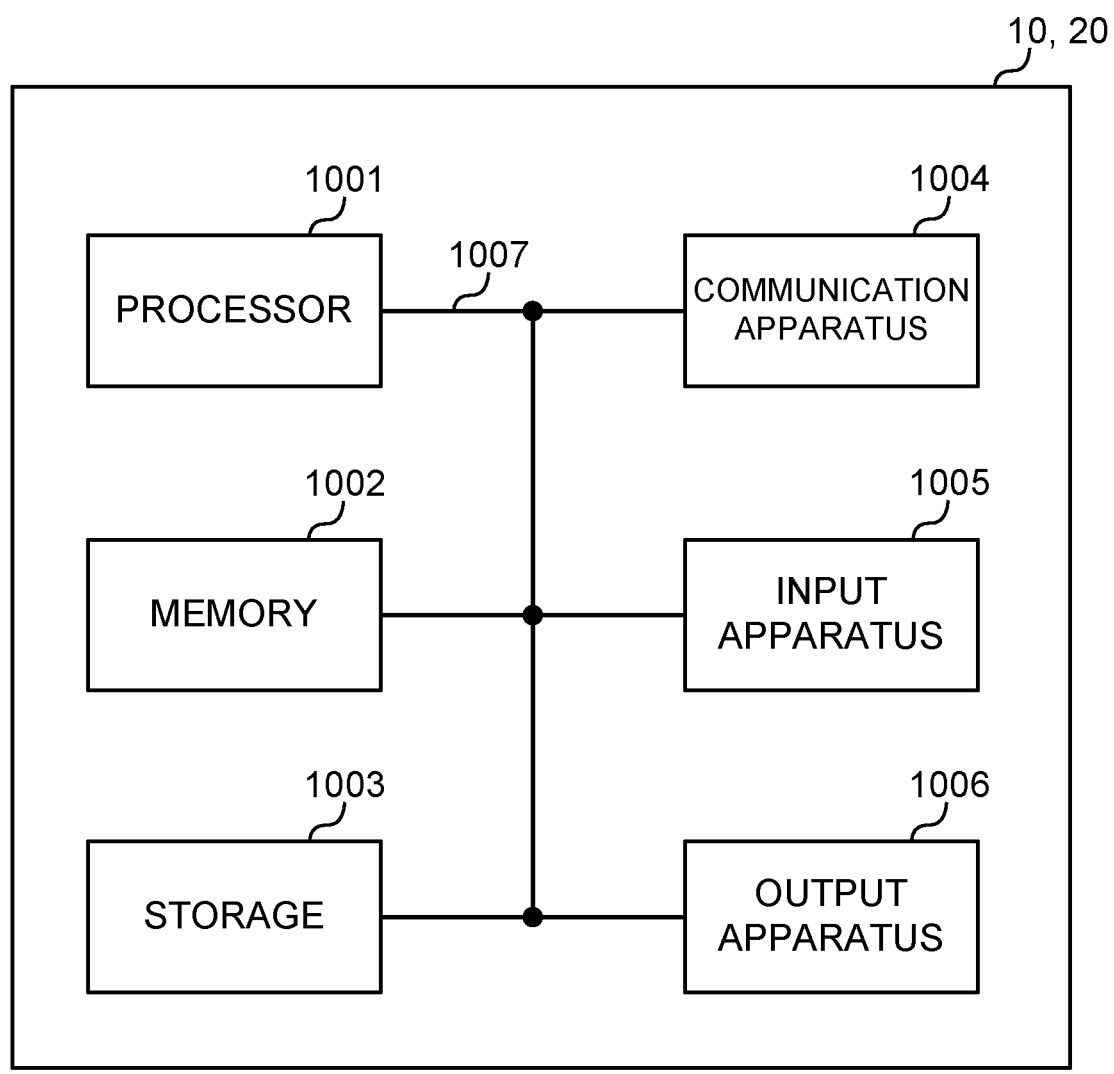
FIG. 20 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 20 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EE- PROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG),"a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain channel/signal outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
    a processor that determines, using a single downlink control information (DCI), multiple spatial relation information (SRI) for repetitive transmission of a physical uplink shared channel (PUSCH) to multiple transmission/reception points (TRPs); and
    a transmitter that performs the repetitive transmission of the PUSCH, based on the multiple SRI,
    wherein when a number of SRI indicated by the DCI is same as a number of repetitive transmissions of the PUSCH, the processor applies the SRI in order from a first repetition to a last repetition of the PUSCH, or in order from the last repetition to the first repetition of the PUSCH, and when the number of the SRI is smaller than the number of repetitive transmissions of the PUSCH, the processor applies, based on a given rule, the SRI cyclically or sequentially for each repetition of the PUSCH, and
    wherein when the number of the SRI is 2 and the number of repetitive transmissions of the PUSCH is 4, the processor applies first SRI to the first repetition and a third repetition of the PUSCH and applies second SRI to a second repetition and a fourth repetition of the PUSCH, or applies the first SRI to the first repetition and the second repetition of the PUSCH and applies the second SRI to the third repetition and the fourth repetition of the PUSCH.

2. The terminal according to claim 1, wherein the transmitter performs the repetitive transmission of the PUSCH based on one or more transmission configuration indication (TCI) states that are selected, from a set of given TCI states among active TCI states, based on a value of a given field of the DCI.

3. The terminal according to claim 1, wherein the transmitter transmits capability information indicating support of a different spatial relation for the repetitive transmission of the PUSCH.

4. A radio communication method for a terminal, comprising:
    determining, using a single downlink control information (DCI), multiple spatial relation information (SRI) for repetitive transmission of a physical uplink shared channel (PUSCH) to multiple transmission/reception points (TRPs); and
    performing the repetitive transmission of the PUSCH, based on the multiple SRI,
    wherein when a number of SRI indicated by the DCI is same as a number of repetitive transmissions of the PUSCH, applying the SRI in order from a first repetition to a last repetition of the PUSCH, or in order from the last repetition to the first repetition of the PUSCH, and when the number of the SRI is smaller than the number of repetitive transmissions of the PUSCH, applying, based on a given rule, the SRI cyclically or sequentially for each repetition of the PUSCH, and wherein when the number of the SRI is 2 and the number of repetitive transmissions of the PUSCH is 4, applying first SRI to the first repetition and a third repetition of the PUSCH and applying second SRI to a second repetition and a fourth repetition of the PUSCH, or applying the first SRI to the first repetition and the second repetition of the PUSCH and applying the second SRI to the third repetition and the fourth repetition of the PUSCH.

5. A base station comprising:

a transmitter that transmits, to a terminal, a single downlink control information (DCI) that is used for determining multiple spatial relation information (SRI) for repetitive transmission of a physical uplink shared channel (PUSCH) to multiple transmission/reception points (TRPs); and a receiver that receives the repetitive transmission of the PUSCH transmitted, from the terminal, based on the multiple SRI, wherein when a number of SRI indicated by the DCI is same as a number of repetitive transmissions of the PUSCH, the SRI is applied in order from a first repetition to a last repetition of the PUSCH, or in order from the last repetition to the first repetition of the PUSCH, and when the number of the SRI is smaller than the number of repetitive transmissions of the PUSCH, the SRI is applied, based on a given rule, cyclically or sequentially for each repetition of the PUSCH, and wherein when the number of the SRI is 2 and the number of repetitive transmissions of the PUSCH is 4, first SRI is applied to the first repetition and a third repetition of the PUSCH and second SRI is applied to a second repetition and a fourth repetition of the PUSCH, or the first SRI is applied to the first repetition and the second repetition of the PUSCH and the second SRI is applied to the third repetition and the fourth repetition of the PUSCH.

6. A system comprising a terminal and a base station, wherein the terminal comprises:

a processor that determines, using a single downlink control information (DCI), multiple spatial relation information (SRI) for repetitive transmission of a physical uplink shared channel (PUSCH) to multiple transmission/reception points (TRPs); and a transmitter that performs the repetitive transmission of the PUSCH, based on the multiple SRI, wherein when a number of SRI indicated by the DCI is same as a number of repetitive transmissions of the PUSCH, the processor applies the SRI in order from a first repetition to a last repetition of the PUSCH, or in order from the last repetition to the first repetition of the PUSCH, and when the number of the SRI is smaller than the number of repetitive transmissions of the PUSCH, the processor applies, based on a given rule, the SRI cyclically or sequentially for each repetition of the PUSCH, and wherein when the number of the SRI is 2 and the number of repetitive transmissions of the PUSCH is 4, the processor applies first SRI to the first repetition and a third repetition of the PUSCH and applies second SRI to a second repetition and a fourth repetition of the PUSCH, or applies the first SRI to the first repetition and the second repetition of the PUSCH and applies the second SRI to the third repetition and the fourth repetition of the PUSCH, and the base station comprises:

a transmitter that transmits the DCI to the terminal; and a receiver that receives the repetitive transmission of the PUSCH.

\* \* \* \* \*